US012253832B2

(12) United States Patent
Seo et al.

(10) Patent No.: US 12,253,832 B2
(45) Date of Patent: *Mar. 18, 2025

(54) ELECTRONIC DEVICE FOR CONTROLLING WATCH FACE OF SMART WATCH AND OPERATION METHOD THEREFOR

(71) Applicant: SAMSUNG ELECTRONICS CO., LTD., Suwon-si (KR)

(72) Inventors: Hyung-Jin Seo, Seoul (KR); Roman Ainbound, Moscow (RU)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/391,384

(22) Filed: Aug. 2, 2021

(65) Prior Publication Data
US 2021/0356914 A1 Nov. 18, 2021

Related U.S. Application Data

(63) Continuation of application No. 16/468,764, filed as application No. PCT/KR2018/001317 on Jan. 31, 2018, now Pat. No. 11,079,724.

(30) Foreign Application Priority Data

Jan. 31, 2017 (KR) .................. 10-2017-0014041

(51) Int. Cl.
G04G 21/04 (2013.01)
G04G 9/00 (2006.01)
(Continued)

(52) U.S. Cl.
CPC ........... *G04G 21/04* (2013.01); *G04G 9/0011* (2013.01); *G04G 9/0064* (2013.01);
(Continued)

(58) Field of Classification Search
CPC ..................................................... G04G 9/0064
(Continued)

(56) References Cited

U.S. PATENT DOCUMENTS 6,668,077 B1 * 12/2003 Ohkubo ................. G03B 27/80
382/167
8,384,770 B2 * 2/2013 Konno ................. H04N 13/239
348/51
(Continued)

FOREIGN PATENT DOCUMENTS

JP 2014-174144 A 9/2014
KR 10-2016-0044285 A 4/2016
(Continued)

OTHER PUBLICATIONS

Search Report dated May 10, 2018, issued by the International Searching Authority in International Application No. PCT/KR2018/001317 (PCT/ISA/210).
(Continued)

*Primary Examiner* — Ruay Ho
(74) *Attorney, Agent, or Firm* — Sughrue Mion, PLLC

(57) ABSTRACT

An electronic device according to various embodiments of the present invention may comprise: a camera module; a communication module for communicating with a second electronic device; and a processor for photographing a first screen displayed on a display of the second electronic device and an external background of the second electronic device by using the camera module, and acquiring a second screen for the second electronic device by using the first screen and the external background.

18 Claims, 28 Drawing Sheets

(51) Int. Cl.

| | | |
|---|---|---|
| G06F 3/14 | (2006.01) | |
| G06T 7/194 | (2017.01) | |
| G06T 7/70 | (2017.01) | |
| G06T 7/80 | (2017.01) | |
| G06T 7/90 | (2017.01) | |
| G06V 10/10 | (2022.01) | |
| G06V 10/56 | (2022.01) | |
| G06V 20/00 | (2022.01) | |

(52) U.S. Cl.
CPC ............ *G06F 3/1415* (2013.01); *G06T 7/194* (2017.01); *G06T 7/70* (2017.01); *G06T 7/80* (2017.01); *G06T 7/90* (2017.01); *G06V 10/17* (2022.01); *G06V 10/56* (2022.01); *G06V 20/00* (2022.01)

(58) Field of Classification Search
USPC .............. 368/223; 382/167; 348/51, E9.037; 463/32, 31; 715/769
See application file for complete search history.

(56) References Cited

U.S. PATENT DOCUMENTS

| | | | | |
|---|---|---|---|---|
| 2009/0002517 | A1* | 1/2009 | Yokomitsu | G06V 20/52 |
| | | | | 348/E9.037 |
| 2010/0054592 | A1 | 3/2010 | Nanu et al. | |
| 2012/0249741 | A1* | 10/2012 | Maciocci | G06T 19/006 |
| | | | | 348/51 |
| 2014/0364204 | A1* | 12/2014 | Tornqvist | A63F 13/235 |
| | | | | 463/31 |
| 2015/0020013 | A1* | 1/2015 | Kim | G06F 3/0488 |
| | | | | 715/769 |
| 2015/0042743 | A1 | 2/2015 | Cullen | |
| 2015/0123966 | A1 | 5/2015 | Newman | |
| 2015/0258432 | A1* | 9/2015 | Stafford | A63F 13/426 |
| | | | | 463/32 |
| 2015/0301608 | A1 | 10/2015 | Nagaraju et al. | |
| 2016/0225301 | A1* | 8/2016 | Scepanovic | G09G 3/20 |
| 2016/0357413 | A1* | 12/2016 | Block | G06F 3/04845 |
| 2016/0357420 | A1* | 12/2016 | Wilson | G06F 3/04817 |
| 2017/0039867 | A1* | 2/2017 | Fieldman | G09B 7/00 |
| 2021/0294487 | A1* | 9/2021 | Block | G06F 9/445 |

FOREIGN PATENT DOCUMENTS

| | | |
|---|---|---|
| KR | 10-2016-0078083 A | 7/2016 |
| KR | 10-2016-0092442 A | 8/2016 |
| KR | 10-1686451 B1 | 12/2016 |
| KR | 10-2017-0006014 A | 1/2017 |
| WO | 2014-189197 A1 | 11/2014 |

OTHER PUBLICATIONS

Written Opinion dated May 10, 2018, issued by the International Searching Authority in International Application No. PCT/KR2018/001317 (PCT/ISA/237).

Communication issued on Jan. 29, 2024 by the Korean Intellectual Property Office for Korean Patent Application No. 10-2017-0014041.

Communication dated Sep. 25, 2024, issued by the Korean Intellectual Property Office in Korean Patent Application No. 10-2017-0014041.

* cited by examiner

ELECTRONIC DEVICE FOR CONTROLLING WATCH FACE OF SMART WATCH AND OPERATION METHOD THEREFOR

CROSS-REFERENCE TO RELATED APPLICATION(S)

This application is a Continuation Application of U.S. application Ser. No. 16/468,764 filed Jun. 12, 2019, which is a National Phase Entry of PCT International Application No. PCT/KR2018/001317, filed on Jan. 31, 2018, and claims priority to Korean Patent Applications No. 10-2017-0014041, which was filed in the Korean Intellectual Property Office on filed on Jan. 31, 2017; the entire disclosure of each of these applications is incorporated herein by reference.

TECHNICAL FIELD

The present disclosure relates to an electronic device for controlling the watch face of a smart watch, and a method of operating the electronic device.

BACKGROUND ART

Smart watches have recently been under active development. Accordingly, watch faces as the background of a smart watch have also been under active development.

The watch face of a smart watch is critical in operating the smart watch as an actual watch beyond the other functions of a simple electronic device.

Conventionally, a series of steps are required to change the watch face of a smart watch. Moreover, the existing smart watch has no choice but to select a watch face only within a predetermined range, without reflecting clothes that a user wears, an ambient environment, and/or fashion trends. That is, existing smart watches have limitations in providing the user with various types of watch faces suitable for various situations.

DETAILED DESCRIPTION OF THE INVENTION

Technical Problem

According to aspects of the present disclosure, an electronic device for providing a watch face suitable for the user in consideration of clothes that the user wears or an ambient environments, and a method of operating the electronic device is provided.

Technical Solution

According to various embodiments of the present disclosure, an electronic device may include a camera module, a communication module configured to communicate with a second electronic device, and a processor configured to capture a first screen displayed on a display of the second electronic device and an external background of the second electronic device by using the camera module, and to obtain a second screen for the second electronic device by using the first screen and the external background.

According to various embodiments of the present disclosure, a method of operating an electronic device may include capturing a first screen displayed on a display of a second electronic device and an external background of the second electronic device by using a camera module, and obtaining a second screen for the second electronic device by using the captured first screen and external background.

According to various embodiments of the present disclosure, an electronic device may include a display, a communication module communicating with a first electronic device, and a processor configured to display a first screen on the display in response to information about the first screen, received from the first electronic device, for configuring a second screen of a second electronic device, and to receive, when the first electronic device captures an external background of the second electronic device by using the first screen displayed on the second electronic device, information about the second screen from the first electronic device, for use in configuring the second screen.

Advantageous Effects

According to an embodiment of the present disclosure, the electronic device has the effect of automatically providing a watch face suitable for a user in consideration of clothes that the user wears or an ambient environment, without the need for complicated steps.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
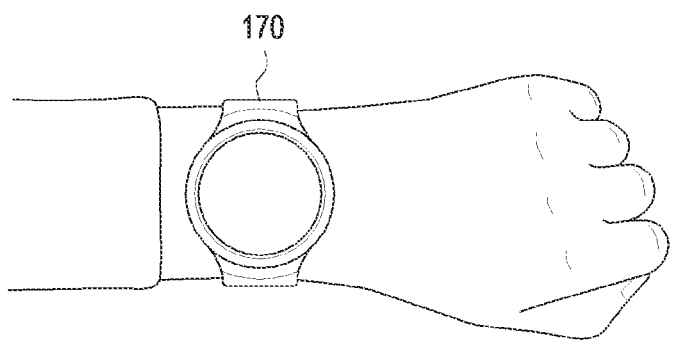
FIG. 1 is an overall diagram illustrating an electronic system according to various embodiments of the present disclosure.
Figure 1:
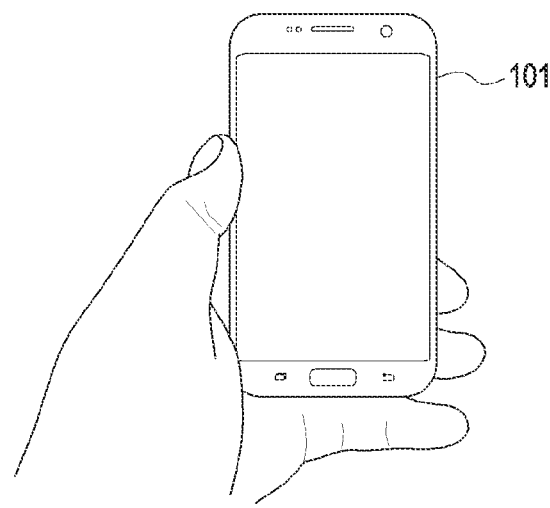

Reference will be made to various embodiments of the disclosure with reference to the attached drawings. It should be appreciated that the embodiments and the terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun corresponding to an item may include one or more of the things, unless the relevant context clearly indicates otherwise. As used herein, each of such phrases as "A or B" or "at least one of A and/or B" may include all possible combinations of the items enumerated together in a corresponding one of the phrases. As used herein, such terms as "1st" and "2nd" or "first" and "second" may be used to simply distinguish a corresponding component from another, and does not limit the components in importance or order. It is to be understood that if an element (e.g., a first element) is referred to as "(operatively or communicatively) coupled with" or "coupled to" another element (e.g., a second element), it means that the element may be coupled with the other element directly or via a third element.

The term "configured to" as used herein may be interchangeably used with, for example, the term "suitable for", "having the capacity to", "adapted to", "made to", "capable of", or "designed to" in hardware or software under circumstances. Under some circumstances, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations by executing one or more software programs stored in a memory device An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device. The wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or tattoo), or an implantable circuit. According to some embodiments, an electronic device may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic picture frame.

According to other embodiments, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, a drone, an automatic teller's machine (ATM) in a financial facility, a point of sale (POS) device in a shop, or an Internet of things device (e.g., a lighting bulb, various sensors, a sprinkler, a fire alarm, a thermostat, a street lamp, a toaster, sports goods, a hot water tank, a heater, a boiler, or the like). According to some embodiments, an electronic device may include at least one of furniture, part of a building/structure or a vehicle, an electronic board, an electronic signature receiving device, a projector, or various measuring devices (e.g., a water, electricity, gas or electromagnetic wave measuring device). According to various embodiments, an electronic device may be flexible, or may be one or a combination of two or more of the foregoing devices. An electronic device according to an embodiment of the disclosure is not limited to the foregoing devices. In the disclosure, the term user may refer to a person or device (e.g., artificial intelligence electronic device) that uses an electronic device.

The term "module" as used herein may include its ordinary meaning including a hardware, software, or firmware unit. The term "module" may be used interchangeably with terms such as logic, logical block, component or circuit. A "module" may be the smallest unit of an integrated part or a portion thereof. A "module" may be the smallest unit for performing one or more functions, or a portion thereof. A "module" may be implemented mechanically or electronically. For example, a "module" may include at least one of a known, or to-be-developed, application-specific integrated circuit (ASIC) chip, field-programmable gate arrays (FPGAs), or programmable logic devices that perform certain operations.

At least a part of apparatuses (e.g., modules or their functions) or methods (e.g., operations) according to various embodiments may be implemented as commands stored in a computer-readable storage medium (e.g., a memory), in the form of a programming module. When the commands are executed by a processor, the processor may execute functions corresponding to the commands. The computer-readable medium may include hard disk, floppy disk, magnetic media (e.g., magnetic tape), optical media (e.g., compact disc read-only memory (CD-ROM), digital versatile disc (DVD), magneto-optical media (e.g., floptical disk), internal memory, and the like. Program instructions may include machine language code that is produced by a compiler or high-level language code that may be executed by an interpreter. A module or a programming module according to various embodiments may include one or more of the above-described components, may omit a portion thereof, or may include additional components. Operations that are performed by a module, a programming module or other components according to various embodiments may be processed in a serial, parallel, repetitive, or heuristic manner. Also, some operations may be performed in a different order or omitted, or additional operations may be added.

FIG. 1 is an overall diagram illustrating an electronic system according to various embodiments of the present disclosure.

Referring to FIG. 1, an electronic system 100 may include a first electronic device 101 and a second electronic device 170.

The first electronic device 101 may configure (or change) a screen of the second electronic device 170. For example, the first electronic device 101 may be a device paired with the second electronic device 170.

According to some embodiments, the first electronic device 101 may capture a first screen displayed on the second electronic device 170 and an external background of the second electronic device 170. Further, the first electronic device 101 may obtain (or generate) a second screen for the second electronic device 170, using the captured first screen and external background of the second electronic device 170.

For example, the first screen may be an image including a color pattern. Further, the second screen may be an image including a background screen and/or an idle screen of the second electronic device 170. For example, the second screen may include a watch face. The watch face may be a watch screen, background screen, and/or idle screen of the second electronic device 170 (e.g., a smart watch).

The first electronic device 101 may be configured as a smart phone or a terminal communicable with the second electronic device 170.

The second electronic device 170 may display a screen on a display.

According to some embodiments, the second electronic device 170 may display a screen under the control of the first electronic device 101. For example, the second electronic device 107 may display the first screen under the control of the first electronic device 101. Further, the second electronic device 170 may configure (or change) the second screen (e.g., a watch face) under the control of the first electronic device 101.

The second electronic device 170 may be configured as a wearable device. For example, the second electronic device 170 may be configured as a smart watch or activity tracker. For example, the activity tracker may refer to a device that measures the amount of workout or biometric information.

Figure 2:
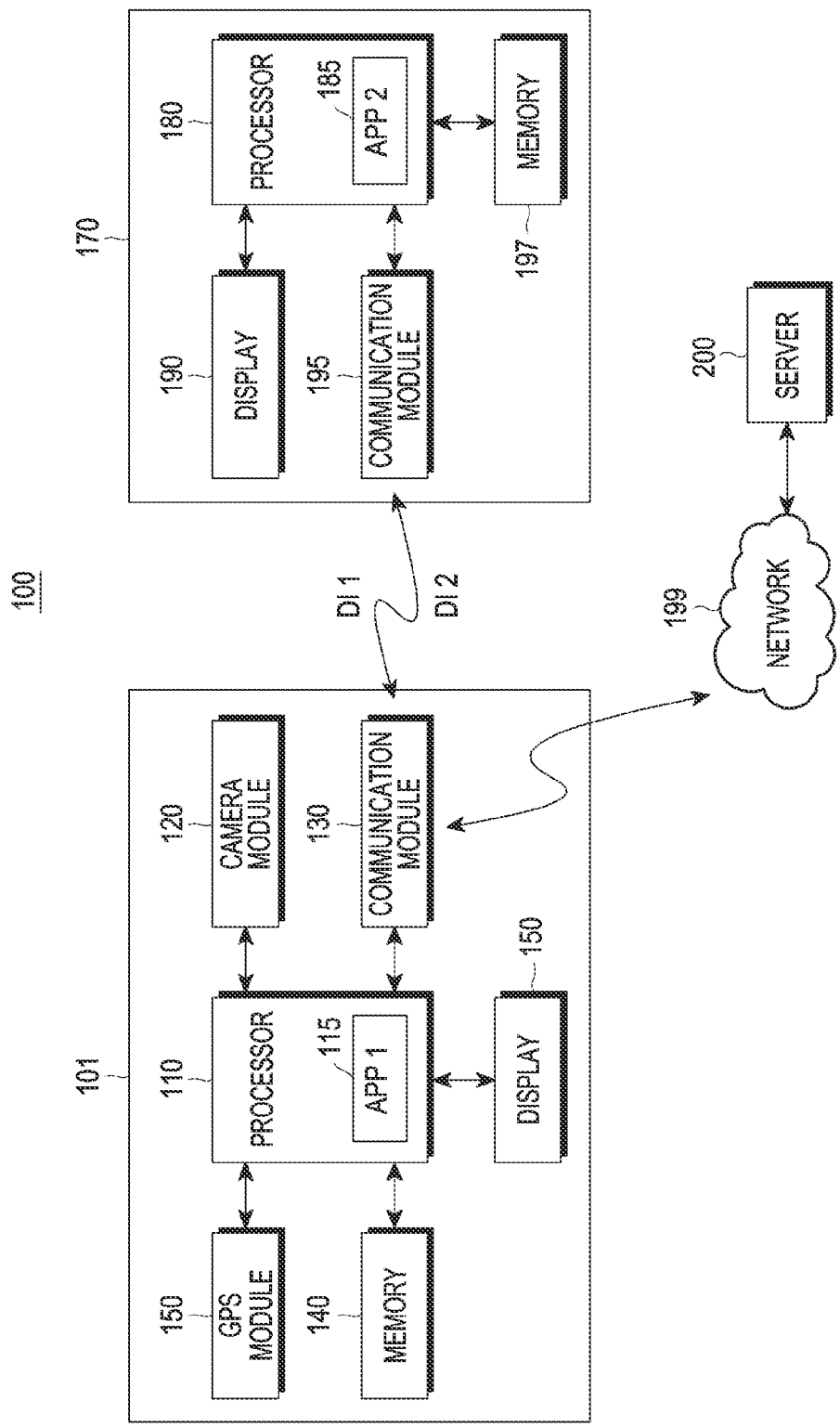
FIG. 2 is a detailed diagram illustrating the electronic system illustrated in FIG. 1.

FIG. 2 is a detailed diagram illustrating the electronic system 100 illustrated in FIG. 1. Referring to FIG. 2, the electronic system 100 illustrated in FIG. 2 may further include a network 199 and a server 200 accessed via the network 199.

The first electronic device 101 may include a processor 110, a camera module 120, a communication module 130, a memory 140, a display 150, and a global positioning system (GPS) module 160. Further, at least one of the components may be omitted in the first electronic device 101 or a component may be added to the first electronic device 101.

The processor 110 may provide overall control to the first electronic device 101.

For example, the processor 110 may include one or more of a CPU, an application processor, or a communication processor (CP). The processor 110 may, for example, control at least one other component of the electronic device 101 and/or perform computing or data processing for communication.

The processor 110 may execute a first application 115 for configuring the second screen of the second electronic device 170. For example, the first application 115 may be an application for configuring (or changing) the background screen, idle screen, and/or watch face of the second electronic device 170.

For the convenience of description, an operation performed by the first application 115 will be described as performed by the processor 110.

According to some embodiments, the processor 110 may configure the second screen of the second electronic device 170. For example, the processor 110 may generate the first screen in order to configure the second screen of the second electronic device 170. Further, the processor 110 may transmit information IM1 about the generated first screen to the second electronic device 170 through the communication module 130. The information IM1 about the first screen may be information about an image included in the first screen so that the second electronic device 170 displays the first screen.

For example, the first screen may be an image including a color pattern. Further, the color pattern of the first screen may change every predetermined period. For example, the processor 110 may transmit the information about the first screen to the second electronic device 170 so that the second electronic device 170 may display the first screen including a color pattern.

The processor 110 may capture the first screen displayed on the second electronic device 470 and the external background of the second electronic device 170 by means of the camera module 120. Further, the processor 110 may obtain (or generate) the second screen of the second electronic device 170, using the captured first screen and external background.

The processor 110 may capture the first screen displayed on the second electronic device 170 and the external background of the second electronic device 170. The processor 110 may obtain information about the external background of the second electronic device 170, using the first screen (e.g., the color pattern). For example, the external background of the second electronic device 170 may include wearing information about the second electronic device 170 (e.g., a wearing position and a wearing pattern) and an ambient color (e.g., an ambient brightness, a skin color, a color and pattern of clothes, and/or a color and pattern of a strap). For example, the external background of the second electronic device 170 may include information about the wearing position and wearing type of the second electronic device, an ambient brightness, the skin color of the user, a color of clothes that the user wears, a pattern or style of the clothes, a color of a strap, and/or a pattern of the strap.

Further, the processor 110 may obtain information about the external background by correcting the captured external background based on the color pattern of the first screen. For example, the processor 110 may identify the ambient color by comparing the color pattern displayed on the second electronic device 170 with at least one of the ambient brightness of the second electronic device, the skin color of the user, the pattern of the clothes that the user wears, the color of the clothes, the color of the strap, or the pattern of the strap. Further, the processor 110 may identify wearing information including at least one of a position, direction, or inclination angle of the second electronic device 170 by comparing the color pattern displayed on the second electronic device 170 with a reference pattern stored in the memory 140 of the first electronic device 110.

As such, the processor 110 may identify the accurate wearing information and ambient color of the second electronic device 170 based on the preset color pattern of the first screen.

The processor 110 may obtain (or generate) the second screen, using the obtained information about the external background. For example, the processor 110 may obtain (or generate) the second screen based on the wearing information and the ambient color.

Further, the processor 119 may obtain the second screen, using a user-preferred image or frequently used image stored in the memory 140. For example, the processor 110 may store a frequently used color or pattern, or a pattern including the color or pattern in the memory 140, and obtain the second screen, using the frequently used color or pattern, or the pattern including the color or pattern.

For example, the processor 110 may obtain the background of the second screen, using the ambient color, and obtain an object to be displayed on the background, in contrast with the background. Further, the processor 110 may obtain additional information based on location information received through the GPS module 160. The processor 110 may generate the second screen by adding an image related to the obtained additional information to the second screen.

The processor 110 may access the server 200 based on the location information and obtain additional information from the server 200. For example, the processor 110 may obtain the additional information related to the location information, stored in the server 200. The additional information may include event information, weather information, country information, time information, season information, and/or fashion information in relation to the location information (e.g., a fashion trend and/or taboo fashion in a region corresponding to the location information). Further, the event information may include information about an event or conference held in the region corresponding to the location information.

The processor 110 may generate the second screen, using the information about the external background. Further, the processor 110 may obtain at least one of screens stored in the memory 140 as the second screen, using the information about the external background.

According to some embodiments, the processor 110 may display the second screen on the display 150. Further, the processor 110 may adjust the size or shape of the second screen in response to an input (e.g., touch input) to the second screen.

The processor 110 may transmit information IM2 about the obtained second screen to the second electronic device 170. The information IM2 about the second screen may refer to information about an image included in the second screen, for use in configuring the second screen in the second electronic device 170.

The camera module 120 may capture the second electronic device 170, the first screen on the second electronic device 170, and the external background of the second electronic device 170. Further, the camera module 120 may transmit the captured first screen and external background of the second electronic device 170 to the processor 110.

For example, the camera module 120 is a device capable of capturing a still image and a video. According to an embodiment, the camera module 120 may include one or more image sensors (e.g., a front sensor or a rear sensor), a lens, an image signal processor (ISP), or a flash (e.g., a light emitting diode (LED) or xenon lamp).

The communication module 130 may transmit and receive data to and from the second electronic device 170 and/or the server 200 by wireless communication or wired communication.

According to an embodiment, the communication module 130 may transmit the information IM1 about the first screen to the second electronic device 170 under the control of the processor 110. Further, the communication module 130 may transmit the information IM2 about the second screen to the second electronic device 170 under the control of the processor 110.

For example, the wireless communication may include cellular communication using, for example, at least one of long-term evolution (LTE), LTE-Advanced (LTE-A), code division multiple access (CDMA), wideband CDMA (WCDMA), universal mobile telecommunication system (UMTS), Wireless Broadband (WiBro), or global system for mobile communications (GSM). According to an embodiment, the wireless communication may include, for example, at least one of wireless fidelity (WiFi), Bluetooth, Bluetooth low power (BLE), Zigbee, near field communication (NFC), magnetic secure transmission (MST), radio frequency (RF) communication, or body area network (BAN). According to an embodiment, the wireless communication may include global navigation satellite system (GNSS). GNSS may be, for example, global positioning system (GPS), global navigation satellite system (Glonass), Beidou navigation satellite system (hereinafter, referred to as "Beidou"), or Galileo, the European global satellite-based navigation system. In the disclosure, the terms "GPS" and "GNSS" are interchangeably used with each other. The wired communication may include, for example, at least one of universal serial bus (USB), high definition multimedia interface (HDMI), recommended standard 232 (RS-232), power line communication, or plain old telephone service (POTS). The network 16*a* may be a telecommunication network, for example, at least one of a computer network (e.g., LAN or WAN), the Internet, or a telephone network.

For example, the communication module 130 may include, for example, a cellular module, a WiFi module, a Bluetooth module, a GNSS module, an NFC module, and/or an RF module. The cellular module may provide, for example, voice call, video call, text service, or Internet service through a communication network. According to an embodiment, the cellular module may identify and authenticate the electronic device 101 in the communication network, using a subscriber identification module (SIM) (e.g., a SIM card). According to an embodiment, the cellular module may execute at least a part of functions available from the processor 110. According to an embodiment, the cellular module may include a communication processor (CP). According to an embodiment, at least a part (e.g., two or more) of the cellular module, the WiFi module, the Bluetooth module, the GNSS module, or the NFC module may be incorporated in one integrated chip (IC) or IC package. The RF module may transmit and receive, for example, a communication signal (e.g., an RF signal). The RF module may include, for example, a transceiver, a power amplification module (PAM), a frequency filter, a low noise amplifier (LNA), or an antenna. According to another embodiment, at least one of the cellular module, the WiFi module, the Bluetooth module, the GNSS module, or the NFC module may transmit and receive an RF signal through a separate RF module. The SIM may include, for example, a SIM card or an embedded SIM. The SIM may include unique identification information (e.g., an integrated circuit card identifier (ICCID)) or subscriber information (e.g., an international mobile subscriber identity (IMSI)).

The memory 140 may store data for configuring the second screen of the second electronic device 170.

According to some embodiments, the memory 140 may store the first application 115. Further, once the processor 110 generates a first screen including a color pattern, the memory 140 may store information about the color pattern as a reference pattern under the control of the processor 110.

For example, the memory 140 may include a volatile memory and/or a non-volatile memory. The memory 140 may, for example, store instructions or data related to at least one other component of the first electronic device 101. According to an embodiment, the memory 140 may store software and/or a program. The program may include, for example, a kernel, middleware, an application programming interface (API), and/or an application program (or "application"). At least a part of the kernel, the middleware, or the API may be referred to as an operating system (OS). The kernel may, for example, control or manage system resources (e.g., a bus, the processor 110, or the memory 140) used to execute an operation or function implemented in other programs (e.g., the middleware, the API, or the application program). Further, the kernel may provide an interface through which the middleware, the API, or the application program accesses individual components of the electronic device 101 and controls or manages system resources.

For example, the memory 140 may include at least one of a volatile memory (e.g., dynamic random access memory (DRAM), static RAM (SRAM), or synchronous dynamic Ram (SDRAM)), a non-volatile memory (e.g., one time programmable ROM (OTPROM), PROM, erasable PROM (EPROM), electrically erasable PROM (EEPROM), mask ROM, or flash ROM), flash memory, hard drive, or solid state drive (SSD).

The display 150 may display an image under the control of the processor 110. For example, the display 150 may be configured as a touch screen.

According to some embodiments, the display 150 may display the second screen obtained by the processor 110. Further, the display 150 may transmit a touch input to the second screen to the processor 110.

For example, the display 150 may include, for example, a liquid crystal display (LCD), a light emitting diode (LED) display, an organic LED (OLED) display, a microelectromechanical systems (MEMS) display, or an electronic paper display. The display 150 may display, for example, various types of content (e.g., text, an image, a video, an icon, and/or a symbol) to the user. The display 150 may include a touch screen and receive a touch input, a gesture input, a proximity input, or a hovering input, for example, by an electronic pen or a user's body part.

The GPS module 160 may receive a GPS signal. Further, the GPS module 160 may transmit location information related to the GPS signal to the processor 110.

The second electronic device 170 may include a processor 180, a display 190, a communication module 195, and a memory 197.

The processor 180 may provide overall control to the second electronic device 170. The processor 180 may be implemented to be substantially similar to the processor of the first electronic device 101.

According to some embodiments, the processor 180 may control an operation of configuring a second screen of the second electronic device 170.

The processor 180 may execute a second application 185 to configure the second screen of the second electronic device 170. For example, the second application 185 may be an application for configuring (or changing) the background screen, idle screen, and/or watch face of the second electronic device 170. Further, the second application 185 may be a counterpart of the first application 115.

For the convenience of description, an operation performed by the second application 185 will be described as performed by the processor 180.

The display 190 may display the first screen under the control of the processor 180. For example, the display 190 may display a first screen including a color pattern.

Further, the display 190 may display a second screen under the control of the processor 180. For example, the display 190 may display the second screen (e.g., a watch face) received from the first electronic device 110.

The communication module 195 may transmit and receive data to and from the communication module 130 of the first electronic device 110. For example, the communication module 195 may receive information IM1 about the first screen and information IM2 about the second screen. Further, the communication module 195 may transmit the information IM1 about the first screen and the information IM2 about the second screen to the processor 180.

The memory 197 may store data used for configuring the second screen of the second electronic device 170. For example, the memory 197 may store the second application used for configuring the second screen. Further, the memory 197 may store the information IM1 about the first screen and the information IM2 about the second screen.

The server 200 may communicate with the first electronic device 101 through the network 199.

According to some embodiments, the server 200 may provide additional information, upon request of the first electronic device 101. For example, the server 20 may transmit additional information related to location information received from the first electronic device 101 to the first electronic device 101.

Figure 3:
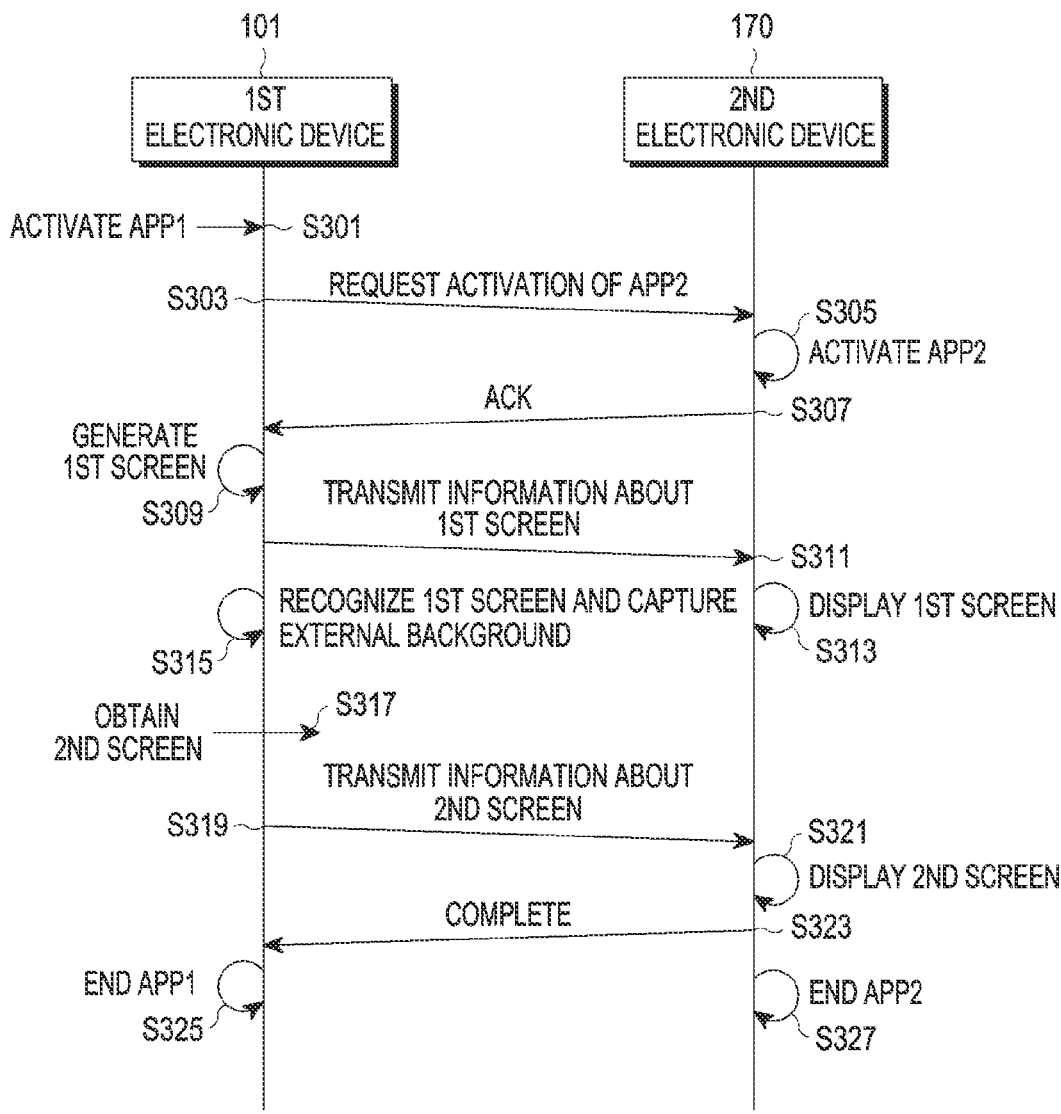
FIG. 3 is a diagram illustrating a signal flow for a method of operating a first electronic device according to various embodiments of the present disclosure.

FIG. 3 is a diagram illustrating a signal flow for a method of operating a first electronic device according to various embodiments of the present disclosure.

Referring to FIGS. 1, 2, and 3, the first electronic device 101 may activate the first application 115 to configure a second screen for the second electronic device 170 in operation S301.

The first electronic device 101 may request the second electronic device 170 to activate the second application 185 in order to configure the second screen in operation S303.

The second electronic device 170 may activate the second application 185 in response to the request of the first electronic device 101 in operation S305. Further, the second electronic device 170 may transmit, to the first electronic device 101, an acknowledgement (ACK) signal indicating that the second application has been executed in operation S307.

The first electronic device 101 may generate the first screen in response to the ACK signal in operation S309. For example, the first electronic device 101 may generate a first screen including a color pattern. The color pattern may include a preset pattern including a plurality of colors. Further, the color pattern may be changed to a plurality of patterns every predetermined period.

The first electronic device 101 may transmit information IM1 about the first screen to the second electronic device 170 in operation S311.

The second electronic device 170 may display the first screen on the display 190, using the information IM1 about the first screen in operation S313.

The first electronic device 101 may recognize the first screen displayed on the second electronic device 170 in operation S315. Further, the first electronic device 101 may capture an external background based on the first screen displayed on the second electronic device 170 in operation S315. The first electronic device 101 may correct the brightness and chroma of the external background based on the first screen including a color pattern. For example, the first electronic device 101 may correct an ambient color of the second electronic device 170 (e.g., an ambient brightness and a skin color), using the color pattern. Further, the first electronic device 101 may correct a position and color of clothes that the user wears based on the first screen including the color pattern.

The first electronic device 101 may obtain (or generate) a second screen, using information about the external background in operation S317. Further, the first electronic device may obtain (or generate) a plurality of second screens, using the information about the external background.

The first electronic device 101 may transmit the information IM2 about the second screen to the second electronic device 170 in operation S319. If a plurality of second screens are obtained (or generated), the first electronic device 101 may select at least one of the second screens and transmit the selected second screen to the second electronic device 170.

The second electronic device 170 may display the second screen based on the received information IM2 about the second screen in operation S321. For example, if the second electronic device 170 applies the second screen, the second electronic device 170 may display the second screen as a watch face. Further, the second electronic device 170 may determine whether to apply the second screen, based on the information IM2 about the second screen.

Upon completion of applying the second screen, the second electronic device 170 may transmit a complete signal indicating that the second screen has completely been configured to the first electronic device 101 in operation S323.

The first electronic device 101 may end the first application 115 in response to the received complete signal in operation S325.

Further, after transmitting the complete signal, the second electronic device 170 may end the second application 185 in operation S327.

Figure 4:
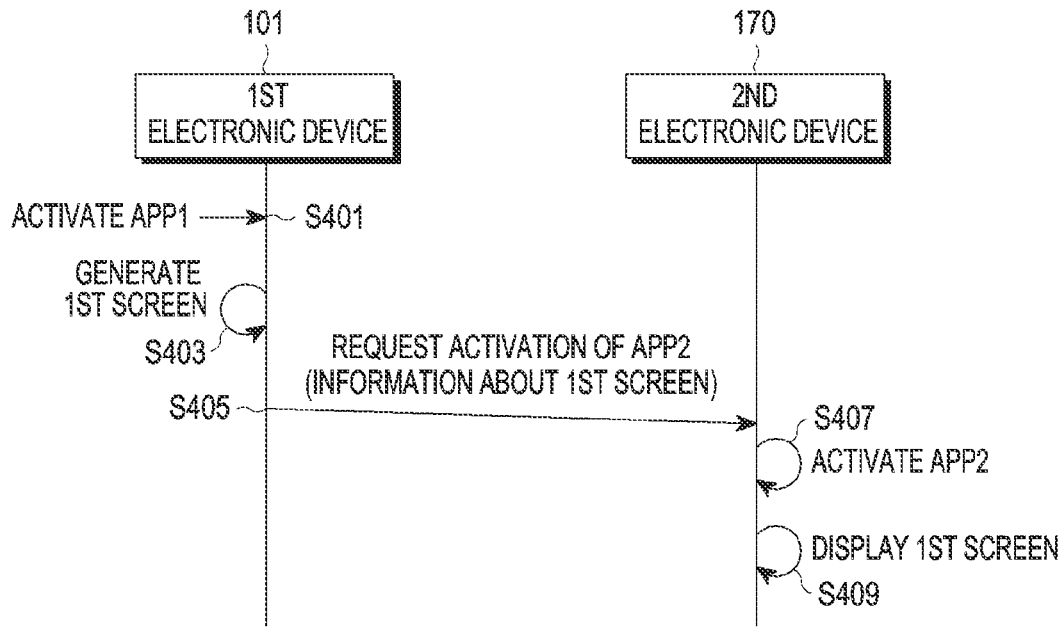
FIG. 4 is a diagram illustrating a signal flow for a method of operating a first electronic device according to various embodiments of the present disclosure.

FIG. 4 is a diagram illustrating a signal flow for a method of operating a first electronic device according to various embodiments of the present disclosure.

Referring to FIGS. 1 to 4, the first electronic device 101 may activate the first application 115 to configure a second screen on the second electronic device 171 in operation S401.

The first electronic device 101 may generate a first screen in operation S403. For example, the first electronic device 101 may generate a first screen including a color pattern. The color pattern may include a predetermined pattern in a plurality of colors. The color pattern may be changed every predetermined period.

The first electronic device 101 may request the second electronic device 170 to activate the second application 185 in order to configure the second screen in operation S405. The first electronic device 101 may transmit information IM1 about the first screen along with the request of activating the second application 185 to the second electronic device 170 in operation S405.

The second electronic device 170 may activate the second application 185 in response to the request of the first electronic device 101 in operation S407. Further, the second electronic device 170 may display the first screen on the display 190, using the information IM1 about the first screen in operation S409.

The subsequent operations of the first electronic device 101 and the second electronic device 170 may be performed substantially in the same or similar manner as or to the operations S315 to S327 described before with reference to FIG. 3.

Figure 5:
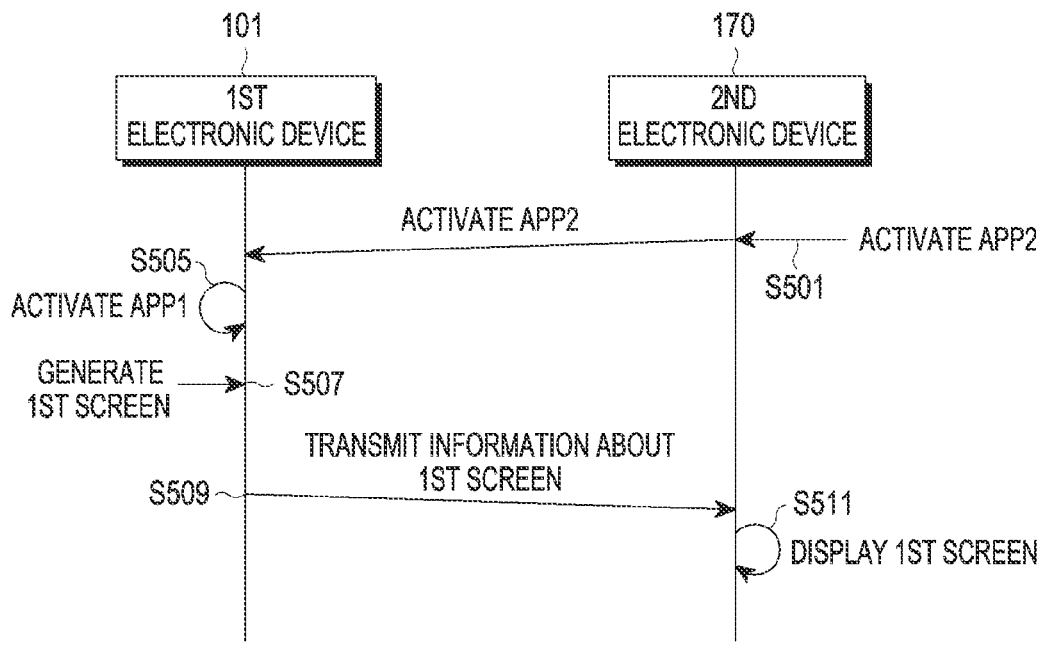
FIG. 5 is a diagram illustrating a signal flow for a method of operating a first electronic device according to various embodiments of the present disclosure.

FIG. 5 is a diagram illustrating a signal flow for a method of operating a first electronic device according to various embodiments of the present disclosure.

Referring to FIGS. 1 to 5, the second electronic device 170 may activate the second application 185 to configure a second screen of the second electronic device 170 in operation S501.

The second electronic device 170 may request the first electronic device 101 to activate the first application 115 to configure the second screen in operation S503. Herein, the second electronic device 170 may request generation of a first screen to configure the second screen.

The first electronic device 101 may activate the first application 115 in response to the request of the second electronic device 170 in operation S505. Further, the first electronic device 101 may generate a first screen in operation S507. For example, the first electronic device 101 may generate a first screen including a color pattern. The color pattern may include a predetermined pattern in a plurality of colors. The color pattern may be changed to a plurality of patterns every predetermined period.

The first electronic device 101 may transmit information IM1 about the first screen to the second electronic device 170 in operation S509.

The second electronic device 170 may display the first screen on the display 190, using the information IM1 about the first screen in operation S511.

The subsequent operations of the first electronic device 101 and the second electronic device 170 may be performed substantially in the same or similar manner as or to the operations S315 to S327 described before with reference to FIG. 3.

Figure 6:
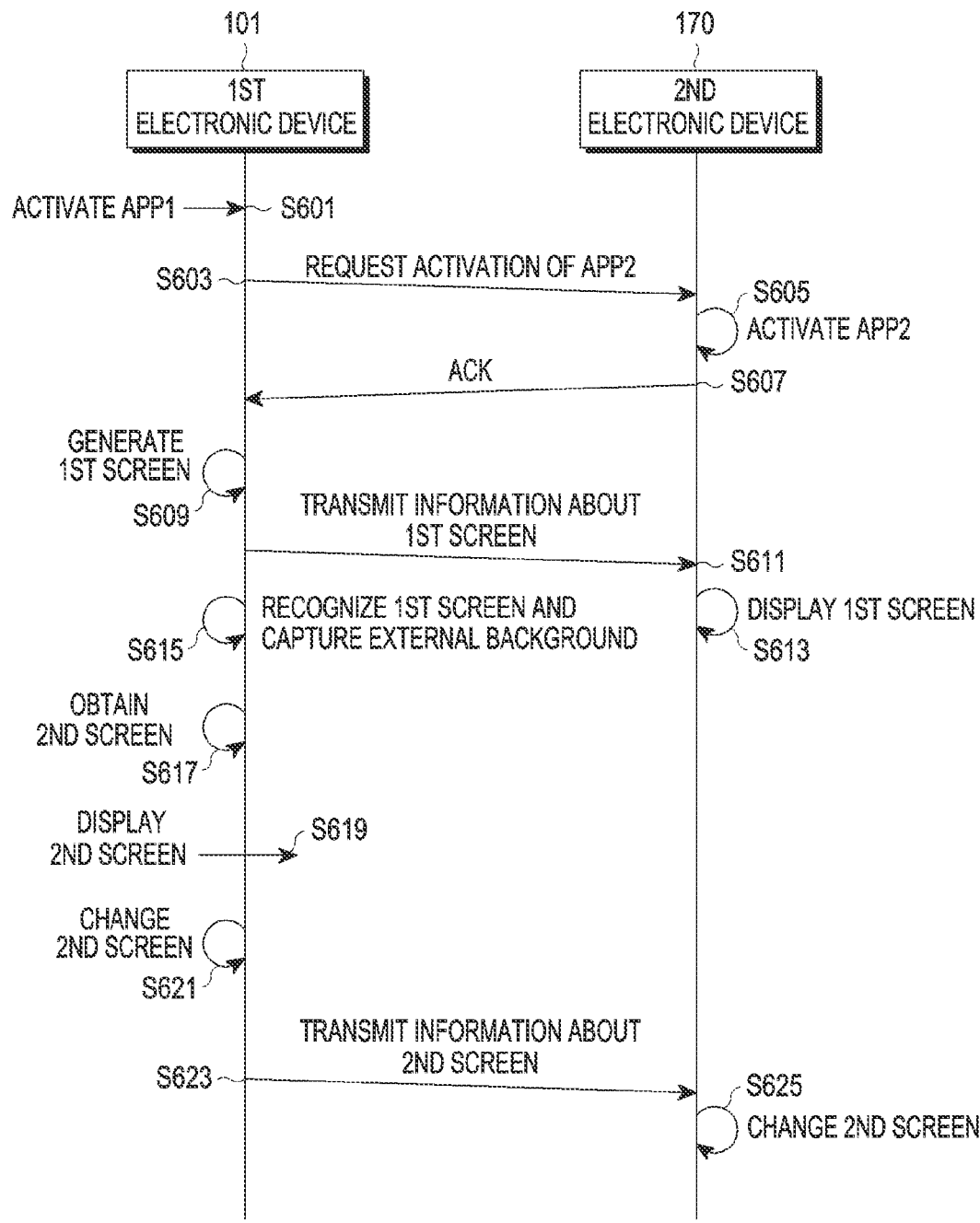
FIG. 6 is a diagram illustrating a signal flow for a method of operating a first electronic device according to various embodiments of the present disclosure.

FIG. 6 is a diagram illustrating a signal flow for a method of operating a first electronic device according to various embodiments of the present disclosure.

Referring to FIGS. 1 to 6, the first electronic device 101 may activate the first application 115 to configure a second screen on the second electronic device 170 in operation S601.

The first electronic device 101 may request the second electronic device 171 to activate the second application 185 to configure the second screen in operation S603.

The second electronic device 170 may activate the second application 185 in response to the request of the first electronic device 101 in operation S605. Further, the second electronic device 170 may transmit an ACK signal indicating that the second application 185 has been executed to the first electronic device 101 in operation S607.

The first electronic device 101 may generate a first screen in response to the ACK signal in operation S609. The first electronic device 101 may transmit information IM1 about the first screen to the second electronic device 170 in operation S611.

The second electronic device 170 may display the first screen on the display 190, using the information IM1 about the first screen in operation S613.

The first electronic device 101 may recognize the first screen displayed on the second electronic device 170 in operation S615. Further, the first electronic device 101 may capture an external background based on the first screen displayed on the second electronic device 170 in operation S615. Herein, the first electronic device 101 may correct the external background based on the first screen including a color pattern.

The first electronic device 101 may obtain (or generate) a second screen, using information about the obtained external background in operation S617.

The first electronic device 101 may display the second screen on the display 150 in operation S619.

The first electronic device 101 may adjust the displayed second screen in operation S621. For example, the first electronic device 101 may adjust the size or shape of the second screen in response to an input (e.g., a touch input) to the second screen. For example, the input to the second screen may include zoom-up, zoom-out, and/or swipe.

Further, the first electronic device 101 may add an image to the second screen in response to the input to the second screen. The added image may be an image stored in the memory 140 and/or an image obtained from the server 200.

The first electronic device 101 may transmit information IM2 about the adjusted second screen to the second electronic device 170 in operation S623.

The second electronic device 170 may display the second screen, based on the received information IM2 about the second screen in operation S625. For example, the second electronic device 170 may display the second screen as a watch face.

Figure 7:
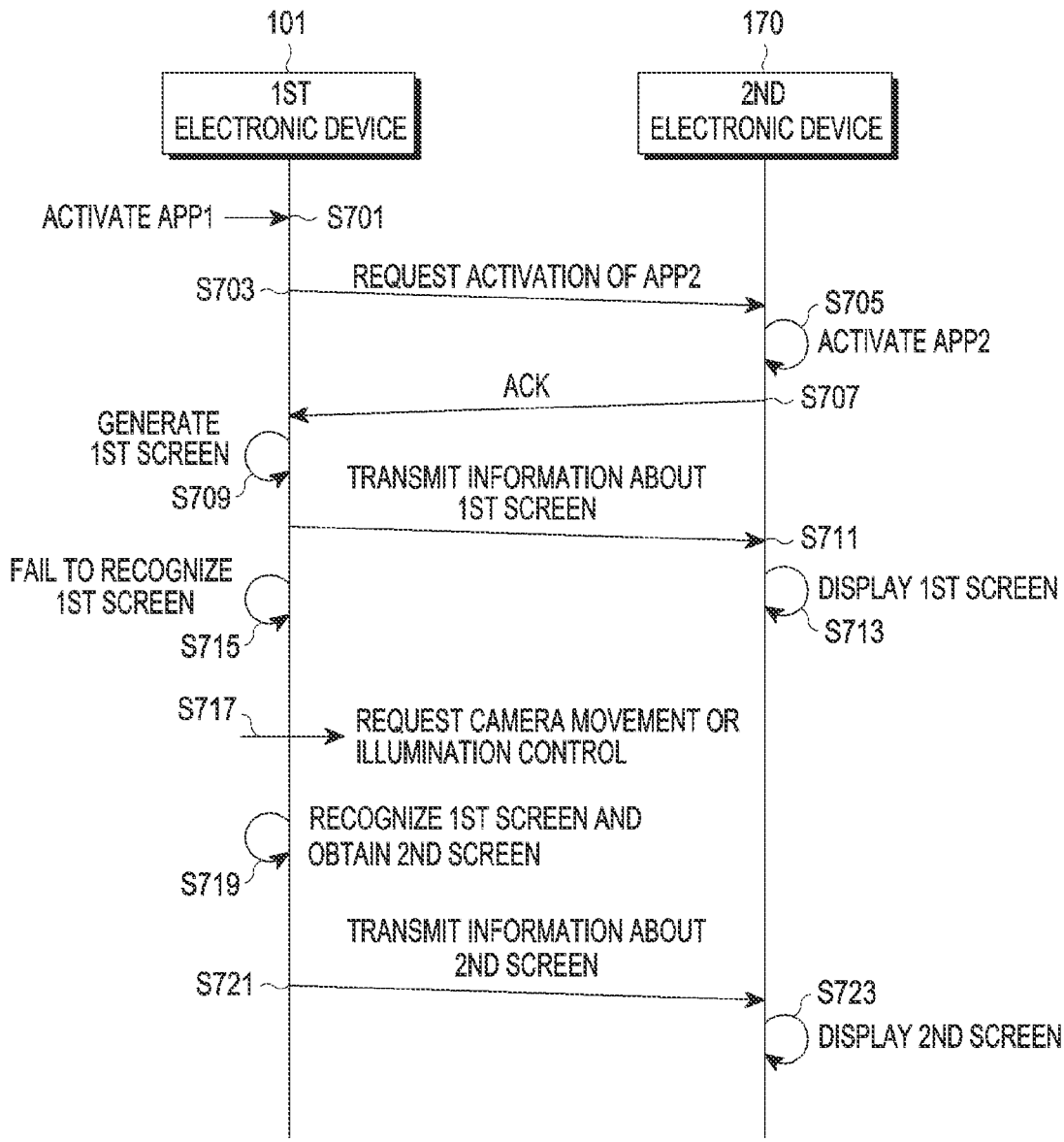
FIG. 7 is a diagram illustrating a signal flow for a method of operating a first electronic device according to various embodiments of the present disclosure.

FIG. 7 is a diagram illustrating a signal flow for a method of operating a first electronic device according to various embodiments of the present disclosure.

Referring to FIGS. 1 to 7, the first electronic device 101 may activate the first application 115 to configure a second screen of the second electronic device 170 in operation S701.

The first electronic device 101 may request the second electronic device 170 to activate the second application 185 in order to configure the second screen in operation S703.

The second electronic device 170 may activate the second application 185 in response to the request of the first electronic device 101 in operation S705. Further, the second electronic device 170 may transmit, to the first electronic device 101, an ACK signal indicating that the second application has been executed in operation S707.

The first electronic device 101 may generate a first screen in response to the ACK signal in operation S709. The first electronic device 101 may transmit information IM1 about the first screen to the second electronic device 170 in operation S711.

The second electronic device 170 may display the first screen on the display 190, using the information IM1 about the first screen in operation S713.

The first electronic device 101 may fail to recognize the first screen displayed on the second electronic device 170 in operation S715. For example, when ambient illumination of the electronic device 170 is insufficient or excessive, the first electronic device 101 may fail to recognize the first screen displayed on the second electronic device 170. Further, when the position of the first screen displayed on the second electronic device 170 is not aligned with the camera module 120 of the first electronic device 101, the first electronic device 101 may fail to recognize the first screen displayed on the second electronic device 170.

Upon failure of recognizing the first screen, the first electronic device 101 may request movement of a camera and/or illumination control in operation S717. For example, the first electronic device 101 may request movement of a camera and/or illumination control through a pop-up window on the display 150.

When the camera is moved or illumination is controlled so that the first screen may be recognized, the first electronic device 101 may recognize the first screen in operation S719. Further, the first electronic device 101 may obtain (or generate) a second screen, based on the first screen displayed on the second electronic device 170 in operation S719.

The first electronic device 101 may transmit information IM2 about the second screen to the second electronic device 170 in operation S721.

The second electronic device 170 may display the second screen based on the received information IM2 about the second screen in operation S723. For example, the second electronic device 170 may display the second screen as a watch face.

Figure 8:
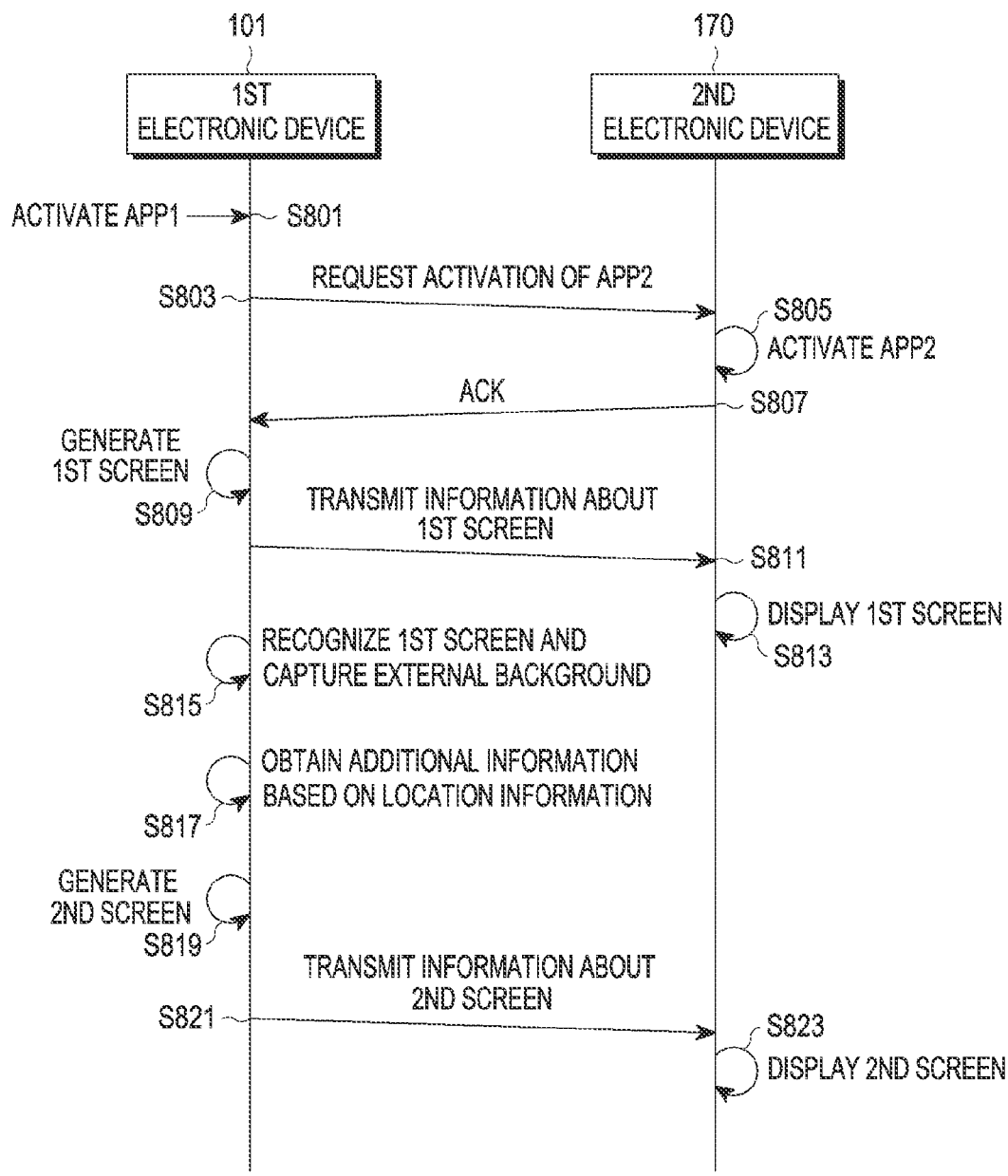
FIG. 8 is a diagram illustrating a signal flow for a method of operating a first electronic device according to various embodiments of the present disclosure.

FIG. 8 is a diagram illustrating a signal flow for a method of operating a first electronic device according to various embodiments of the present disclosure.

Referring to FIGS. 1 to 8, the first electronic device 101 may activate the first application 115 to configure a second screen of the second electronic device 170 in operation S801.

The first electronic device 101 may request the second electronic device 170 to activate the second application 185 in order to configure the second screen in operation S803.

The second electronic device 170 may activate the second application 185 in response to the request of the first electronic device 101 in operation S805. Further, the second electronic device 170 may transmit, to the first electronic device 101, an ACK signal indicating that the second application has been executed in operation S807.

The first electronic device 101 may generate a first screen in response to the ACK signal in operation S809. The first electronic device 101 may transmit information IM1 about the first screen to the second electronic device 170 in operation S811.

The second electronic device 170 may display the first screen on the display 190, using the information IM1 about the first screen in operation S813.

The first electronic device 101 may recognize the first screen displayed on the second electronic device 170 in operation S815. Further, the first electronic device 101 may capture an external background based on the first screen displayed on the second electronic device 170 in operation S815. Herein, the first electronic device 101 may correct the external background based on the first screen including a color pattern.

The first electronic device 101 may obtain additional information based on location information received from the GPS module 160 in operation S817. For example, the first electronic device 101 may access the server 200, and obtain additional information from the server 200, based on the location information.

According to some embodiments, if information obtained from the captured external background is insufficient, the first electronic device 101 may obtain additional information. For example, if information included in the external background is only about the skin color of a user, the first electronic device 101 may obtain additional information.

The first electronic device 101 may obtain (or generate) a second screen, using the information about the external background and the additional information in operation S819. For example, the first electronic device 101 may generate the second screen by adding an image related to the additional information to a screen obtained based on the information about the external background.

The first electronic device 101 may transmit information IM2 about the second screen to the second electronic device 170 in operation S821.

The second electronic device 170 may display the second screen based on the received information IM2 about the second screen in operation S823. For example, the second electronic device 170 may display the second screen as a watch face.

Figure 9:
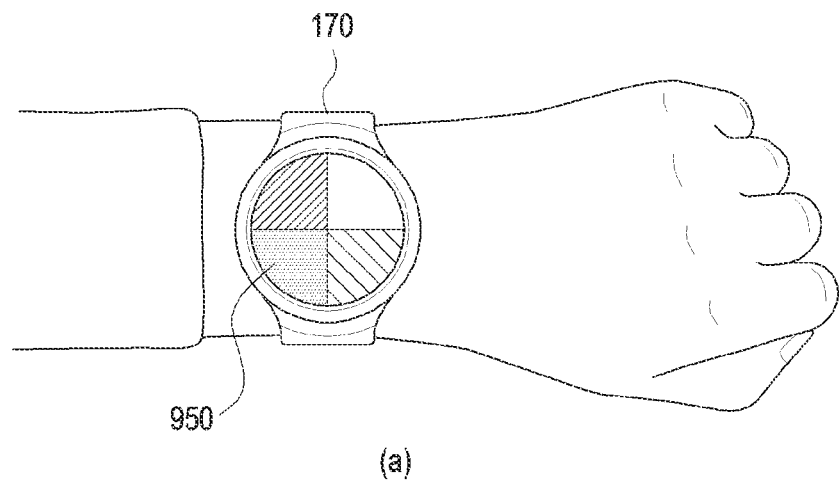
FIG. 9 is a diagram illustrating a first electronic device and a second electronic device according to various embodiments of the present disclosure.
Figure 9:
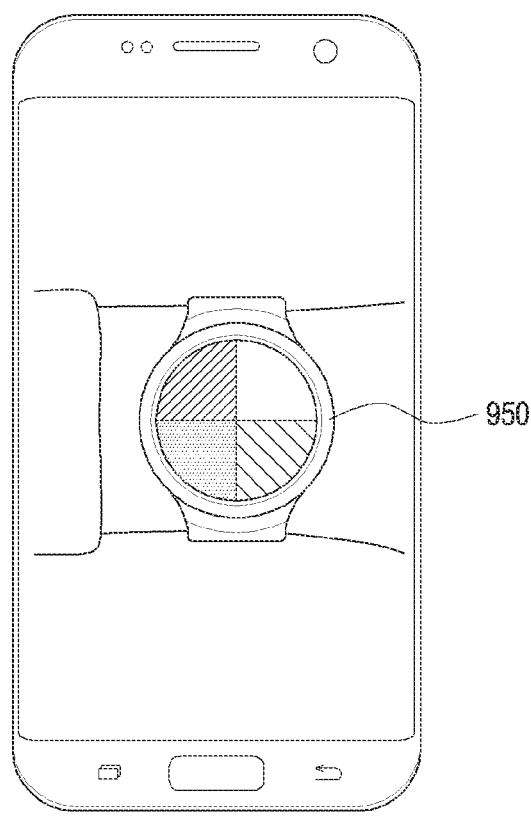

FIG. 9 is a diagram illustrating a first electronic device and a second electronic device according to various embodiments of the present disclosure.

The first electronic device 101 may generate a first screen. Further, the first electronic device 101 may transmit information IM1 about the first screen to the second electronic device 170.

Referring to FIG. 9(a), the second electronic device 170 may display a first screen 990 including a color pattern on the display 190.

Referring to FIG. 9(b), the first electronic device 101 may capture the first screen 950 displayed on the second electronic device 170 and recognize the captured first screen 950. Further, the first electronic device 101 may capture an external background of the second electronic device 170 and correct the captured external background, based on the captured first screen 950.

Figure 10:
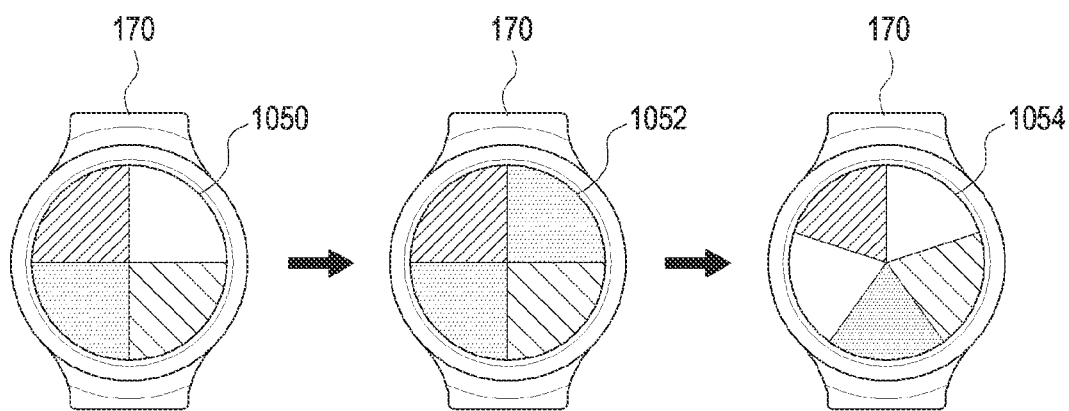
FIG. 10 is a diagram illustrating first screens according to various embodiments of the present disclosure.

FIG. 10 is a diagram illustrating first screens according to various embodiments of the present disclosure.

Referring to FIG. 10, the second electronic device 170 may display first screens 1050, 1052, and 1054 on the display 190.

Each of the first screens 1050, 1052, and 1054 may include a color pattern in a plurality of colors. Further, each of the first screens 1050, 1052, and 1054 may include a color pattern which changes every predetermined period.

For example, the color patterns included in the first screens may be configured in such a manner that the three primary colors of light, red, green, and blue, colors resulting from overlapping the primary colors with each other, and white are at different ratios and different angles. Further, the color patterns may be configured to change every predetermined time (e.g., 100 ms).

For example, the first color pattern 1050 may be configured to include red, green, blue, and white in regions defined at 90 degrees for a first time period. The second color pattern 1052 may be configured to include red, green, blue, and green in regions defined at 90 degrees for a second time period. The third color pattern 1054 may be configured to include red, green, blue, purple, and white in regions defined at 72 degrees for a third time period.

The first electronic device 101 may generate the first color pattern 1050, the second color pattern 1052, and the third color pattern 1054, and configure a color pattern to change sequentially to the first color pattern 1050, the second color pattern 1052, and the third color pattern 1054. Further, the second electronic device 170 may display the first color pattern 1050, the second color pattern 1052, and the third color pattern 1054, and configure a color pattern to change sequentially to the first color pattern 1050, the second color pattern 1052, and the third color pattern 1054, under the control of the first electronic device 101.

Figure 11A:
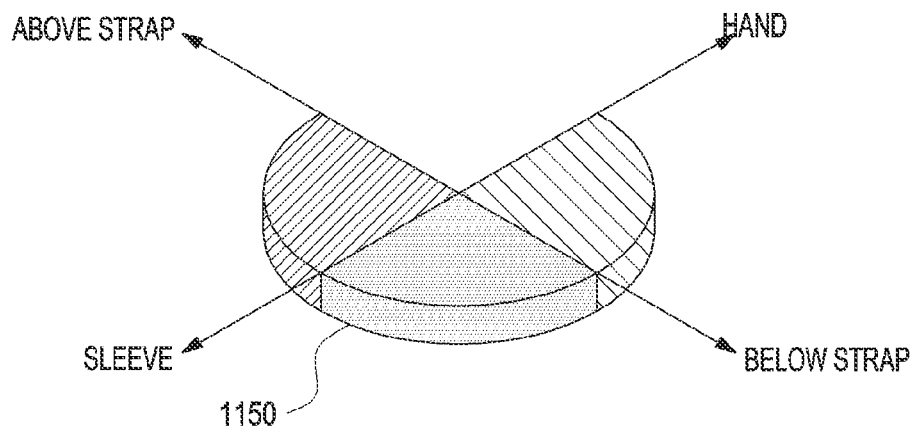
FIGS. 11a and 11b are diagrams illustrating a first screen according to various embodiments of the present disclosure.
Figure 11B:
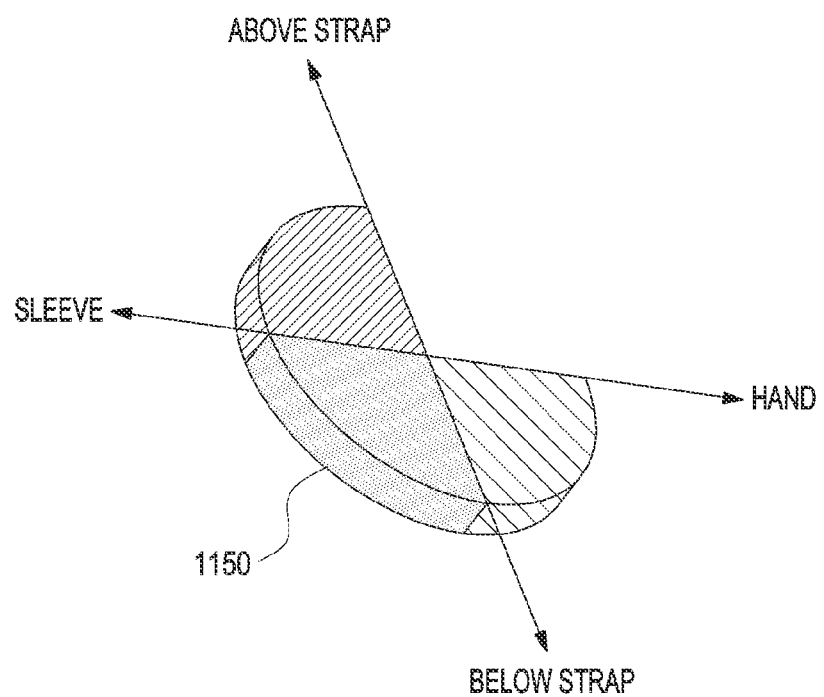

FIGS. 11a and 11b are diagrams illustrating a first screen according to various embodiments of the present disclosure.

The first electronic device 101 may recognize a first screen displayed on the second electronic device 170 through the camera module 120. The first electronic device 101 may generate a first screen (e.g., color pattern) including predetermined colors at a predetermined angle.

Referring to FIGS. 11a and 11b, the first electronic device 101 may determine the position of the user's skin, the position of clothes that the user wears, and up and down positions of a strap attached to the second electronic device 170, based on the positions of colors included in a color pattern 1150 displayed on the second electronic device 170.

Further, even though the captured color pattern 1150 is recognized from a different angle, the first electronic device 101 may determine the position of the user's skin, the position of clothes that the user wears, and up and down positions of a strap attached to the second electronic device 170, based on the positions of colors included in the color pattern 1150 displayed on the second electronic device 170.

Once the first electronic device 101 determines the position of the user's skin, the position of clothes that the user wears, and the up and down positions of the strap attached to the second electronic device 170, based on the color pattern 1150, the first electronic device 101 may determine that the first screen has been recognized.

FIGS. 12a to 12g are diagrams illustrating an operation of obtaining a second screen according to various embodiments of the present disclosure.

Referring to FIGS. 12a to 12g, the first electronic device 101 may obtain information about an ambient brightness A of the second electronic device 170, clothes B that the user wears, and the skin color C of the user, with respect to a first screen 1250.

For the convenience of description, the following description will be given of FIGS. 12a to 12g with the appreciation that A represents the ambient brightness of the second electronic device 170, B represents clothes that the user wears, and C represents the skin color of the user.

Figure 12A:
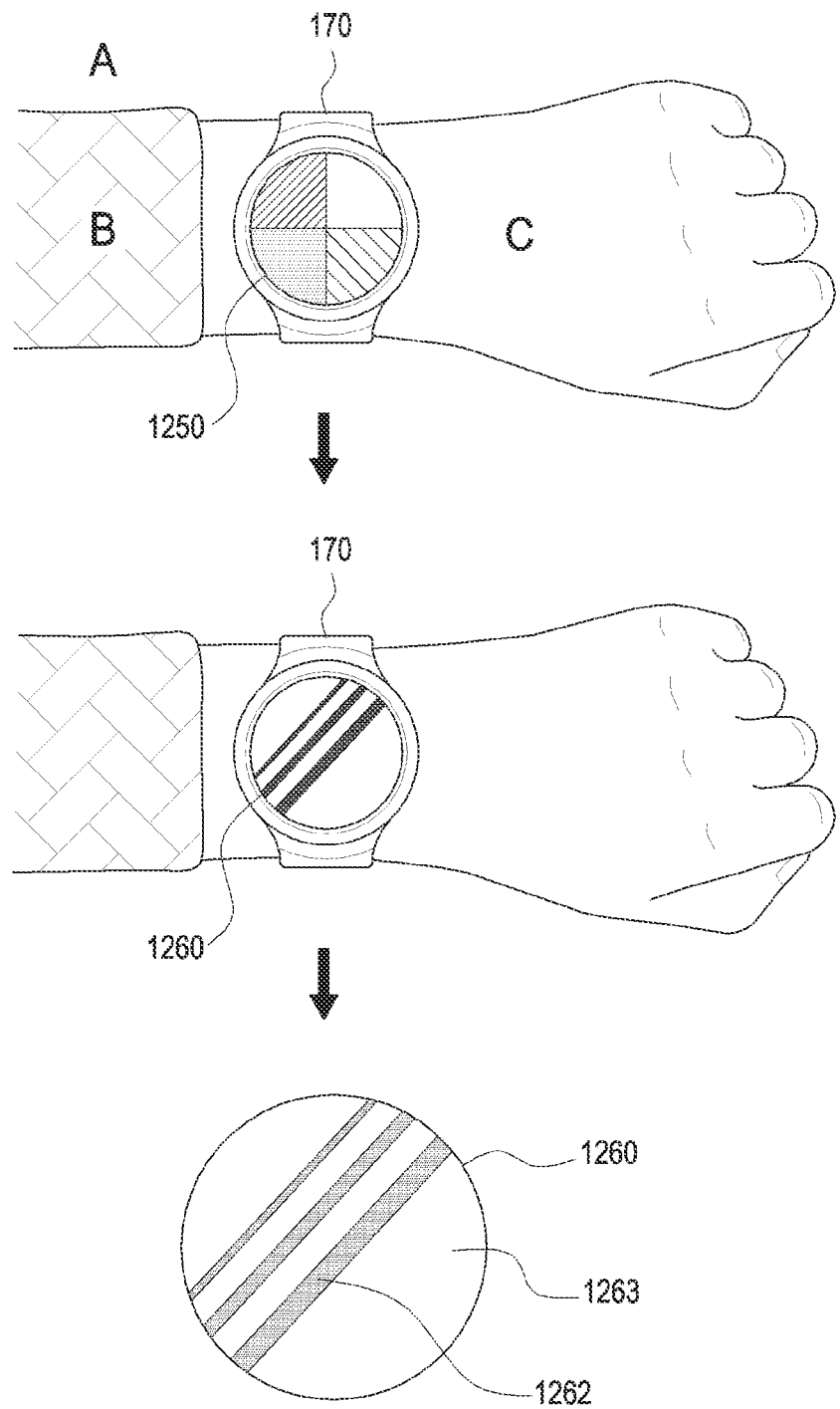
FIGS. 12a to 12g are diagrams illustrating operations of obtaining a second screen according to various embodiments of the present disclosure.

Referring to FIG. 12a, the first electronic device 101 may generate a second screen 1260, using information about the ambient brightness A of the second electronic device 170, clothes B that the user wears, and the skin color C of the user, and display the second screen 1260 on the second electronic device 170.

According to some embodiments, the first electronic device 101 may determine a background 1263 of the second screen 1260 based on the ambient brightness A of the second electronic device 170, a color of clothes B that the user wears, and the skin color C of the user. For example, the first electronic device 101 may determine, as a color of the background 1263, a color identical to, complementary to, and/or neighboring to the ambient brightness A, the color of the clothes B that the user wears, and the skin color C of the user.

Further, the first electronic device 101 may determine an object 1262 of the second screen 1260 based on the ambient brightness A, the color and pattern of the clothes B that the user wears, and the skin color C of the user. For example, the first electronic device 101 may generate a pattern with various thicknesses and intervals based on the color and pattern of the clothes B that the user wears, as an object. Further, the first electronic device 101 may generate the second screen 1260 so that the object 1262 and the background 1263 contrast with or are similar to each other.

Figure 12B:
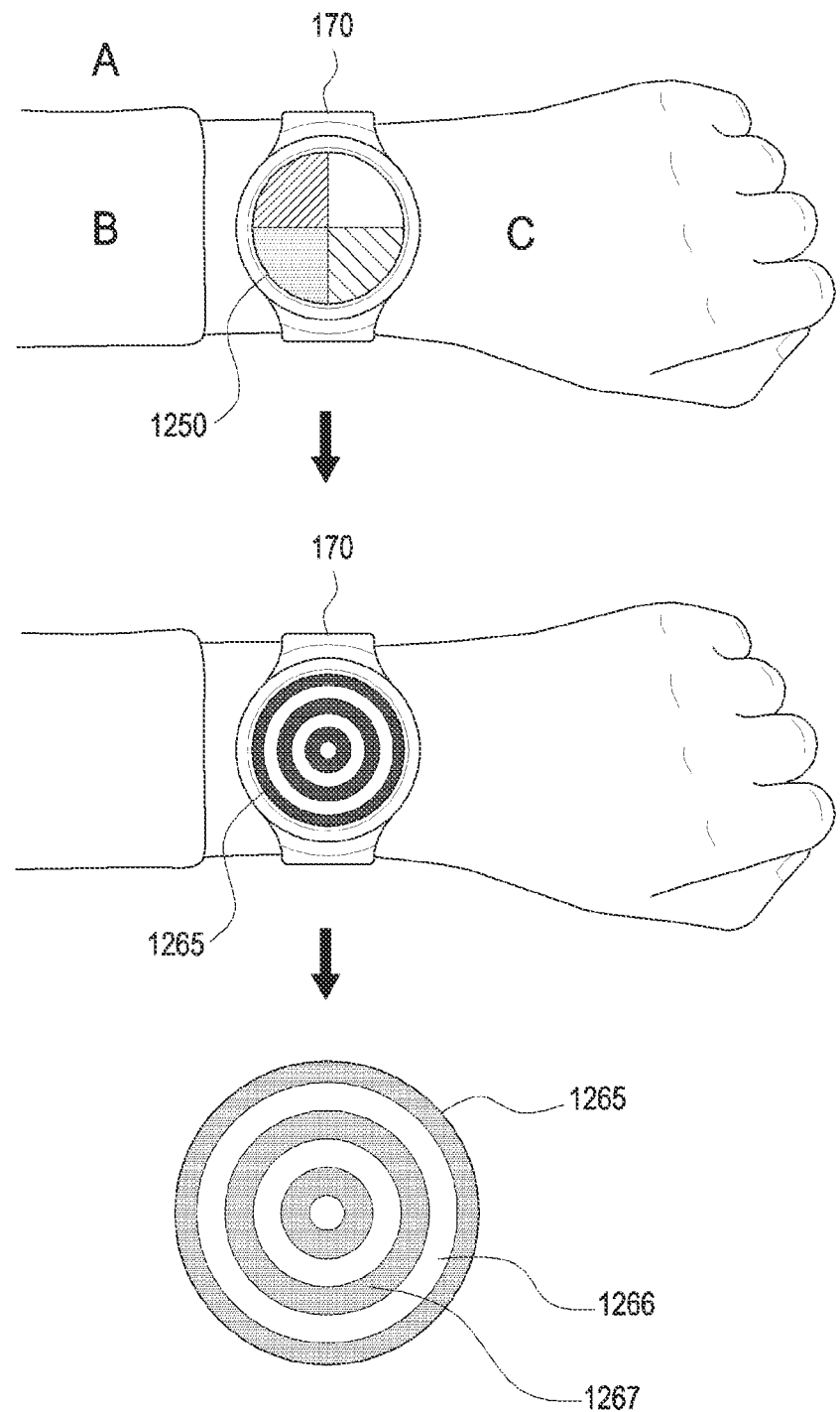

Referring to FIG. 12b, the first electronic device 101 may generate a second screen 1265 based on the obtained ambient brightness A of the second electronic device 170, clothes B that the user wears, and skin color C of the user, and display the second screen 1265 on the second electronic device 170.

According to some embodiments, the first electronic device 101 may determine a background 1266 for the second screen 1265 based on the ambient brightness A, the color of the clothes B that the user wears, and the skin color C of the user. For example, the first electronic device 101 may determine, as a color of the background 1266 of the second screen 1265, a color identical to, complementary to, and/or neighboring to the ambient brightness A, the color of the clothes B that the user wears, and the skin color C of the user.

Further, the first electronic device 101 may determine an object 1267 of the second screen 1260 based on the ambient brightness A, the color and pattern of the clothes B that the user wears, and the skin color C of the user. For example, the first electronic device 101 may generate a pattern with various thicknesses and intervals based on the color and pattern of the clothes B that the user wears, as an object. If the clothes B of the user have no pattern, the first electronic device 101 may generate a pattern with various thicknesses and intervals as an object, based on the color of the clothes B of the user. Herein, the first electronic device 101 may process the pattern with various thicknesses and intervals in gradation, based on the color of the clothes B that the user wears.

The first electronic device 101 may generate the second screen 1265 so that the object 1267 and the background 1266 contrast with each other. Further, the first electronic device 101 may generate the second screen 1265 so that the object 1267 and the background 1266 are similar in color (for example, the object 1267 and the background 1266 may be in gradation).

Figure 12C:
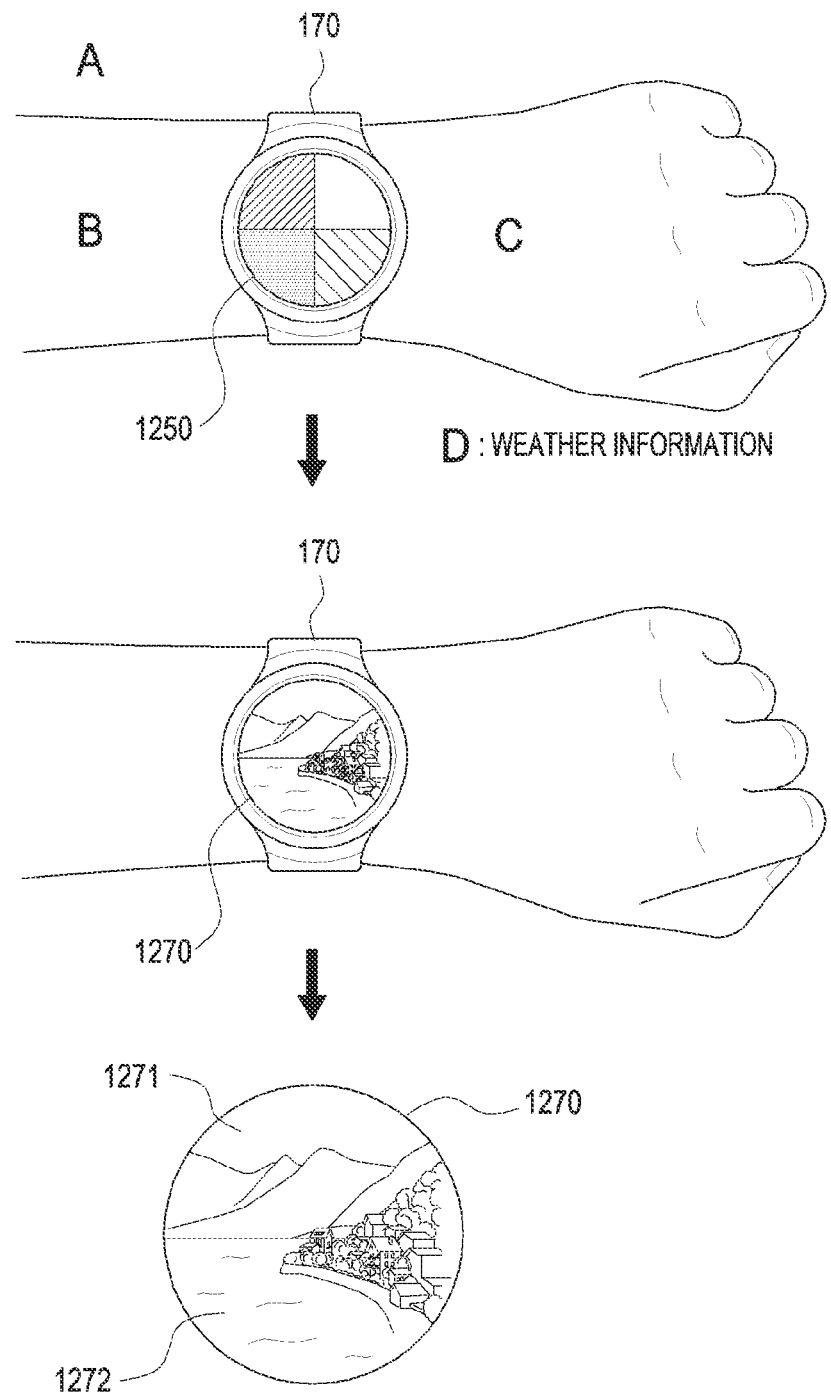

Referring to FIG. 12*c*, the first electronic device 101 may generate a second screen 1270 based on the obtained ambient brightness A of the second electronic device 170, and skin color B and C of the user, and display the second screen 1270 on the second electronic device 170.

According to some embodiments, the first electronic device 101 may determine a background 1271 of the second screen 1270 based on the ambient brightness A, the skin color B and C of the user, and additional information D. Therefore, the first electronic device 101 may obtain additional information (e.g., weather information D) and determine a color for the background 1271, using the weather information D corresponding to the additional information. For example, the first electronic device 101 may generate a color (e.g., red or yellow) representing current weather and/or a color (e.g., blue or bluish green) contrasting with the current weather based on the obtained weather information D (e.g., summer), and determine the color (e.g., blue or bluish green) as the background 1271 of the second screen 1270.

Further, the first electronic device 101 may determine an image related to the weather information D as an object of the second screen 1270. For example, the first electronic device 101 may generate an image (e.g., sun) representing the current weather and/or an image (e.g., sea) contrasting with the current weather, based on the obtained weather information D (e.g., summer), and determine the image (e.g., sea) as an object 1272 of the second screen 1270.

Figure 12D:
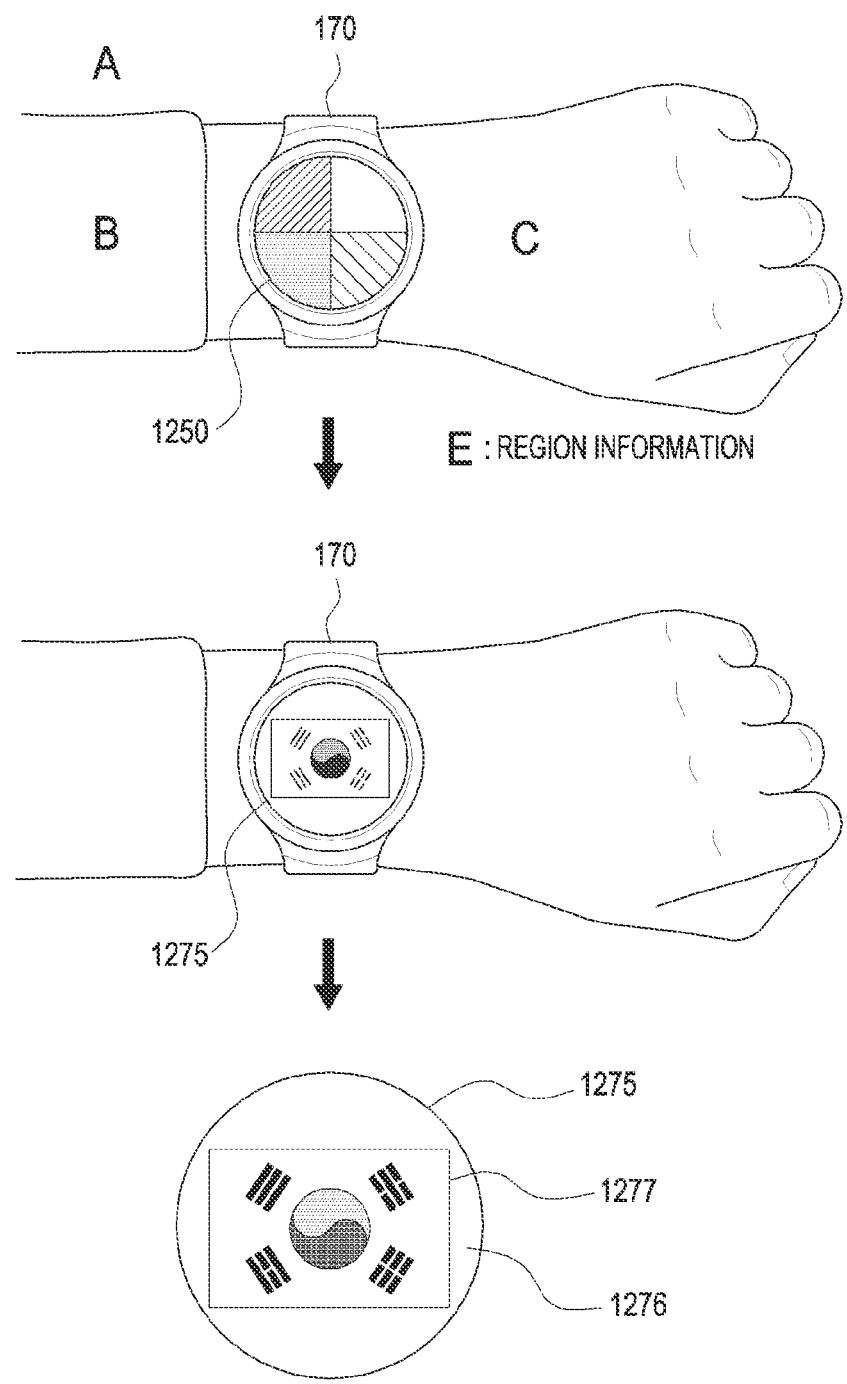

Referring to FIG. 12*d*, the first electronic device 101 may generate a second screen 1275, using region information E in addition to the obtained information about the ambient brightness A of the second electronic device 170, the clothes B of the user, and the skin color C of the user, and display the second screen 1275 on the second electronic device 170.

According to some embodiments, the first electronic device 101 may determine a background 1276 of the second screen 1275 based on the ambient brightness A, the clothes B of the user, the skin color C of the user, and the additional information E. Therefore, the first electronic device 101 may obtain the additional information (e.g., the region information E), and determine a color of the background 1276 using the region information E corresponding to the additional information. Herein, the first electronic device 101 may exclude a color considered taboo in a corresponding region from the background 1276, based on the region information E.

Further, the first electronic device 101 may determine an image related to the region information E as an object 1277 of the second screen 1275. For example, the first electronic device 101 may obtain an image (e.g., the Korean flag) representing a current region based on the obtained region information (e.g., Korea), and determine the image as the object 1277 of the second screen 1275.

Figure 12E:
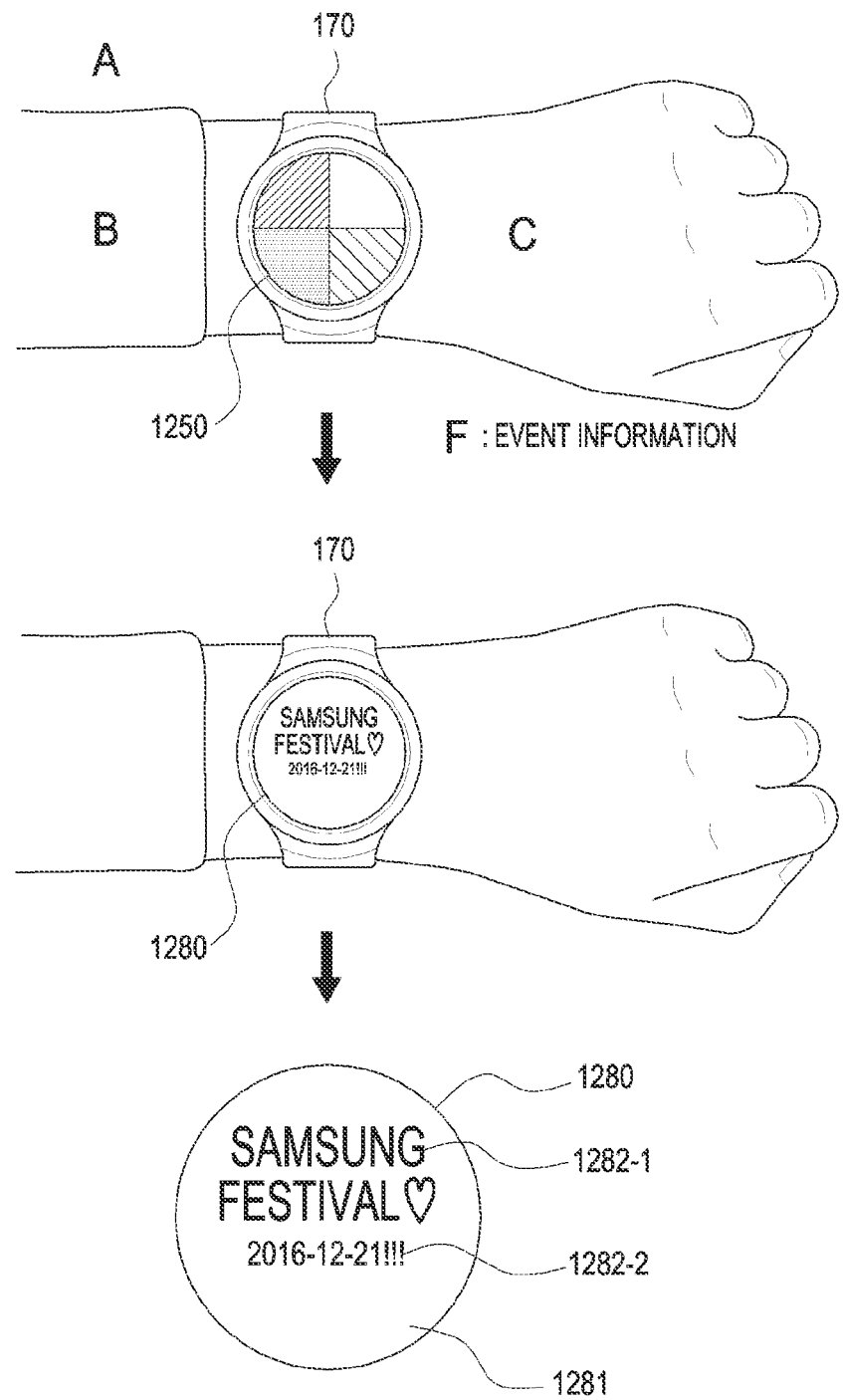

Referring to FIG. 12*e*, the first electronic device 101 may generate a second screen 1280, using event information F in addition to the obtained information about the ambient brightness A of the second electronic device 170, the clothes B of the user, and the skin color C of the user, and display the second screen 1280 on the second electronic device 170.

According to some embodiments, the first electronic device 101 may determine a background 1281 of the second screen 1280 based on the ambient brightness A, the clothes B of the user, the skin color C of the user, and additional information F. Therefore, the first electronic device 101 may acquire the additional information (e.g., the event information F), and determine a color of the background 1281 using the event information F corresponding to the additional information. Herein, the first electronic device 101 may determine a color related to a corresponding event as a color for the background 1281, based on the event information F.

Further, the first electronic device 101 may determine an image related to the event information F as at least one object 1282-1 and 1282-2 of the second screen 1280. For example, the first electronic device 101 may obtain an image (e.g., logo) for an image (e.g., "Samsung Festival") representing a corresponding event based on the obtained event information F (e.g., an event related to "Samsung"), and determine the image (e.g., logo) as a first object 1282 of the second screen 1280. Further, the first electronic device 101 may determine information (e.g., time and/or place) about the corresponding event as a second object 1282-2 of the second screen 1280, based on the obtained event information F (e.g., the event related to Samsung).

Figure 12F:
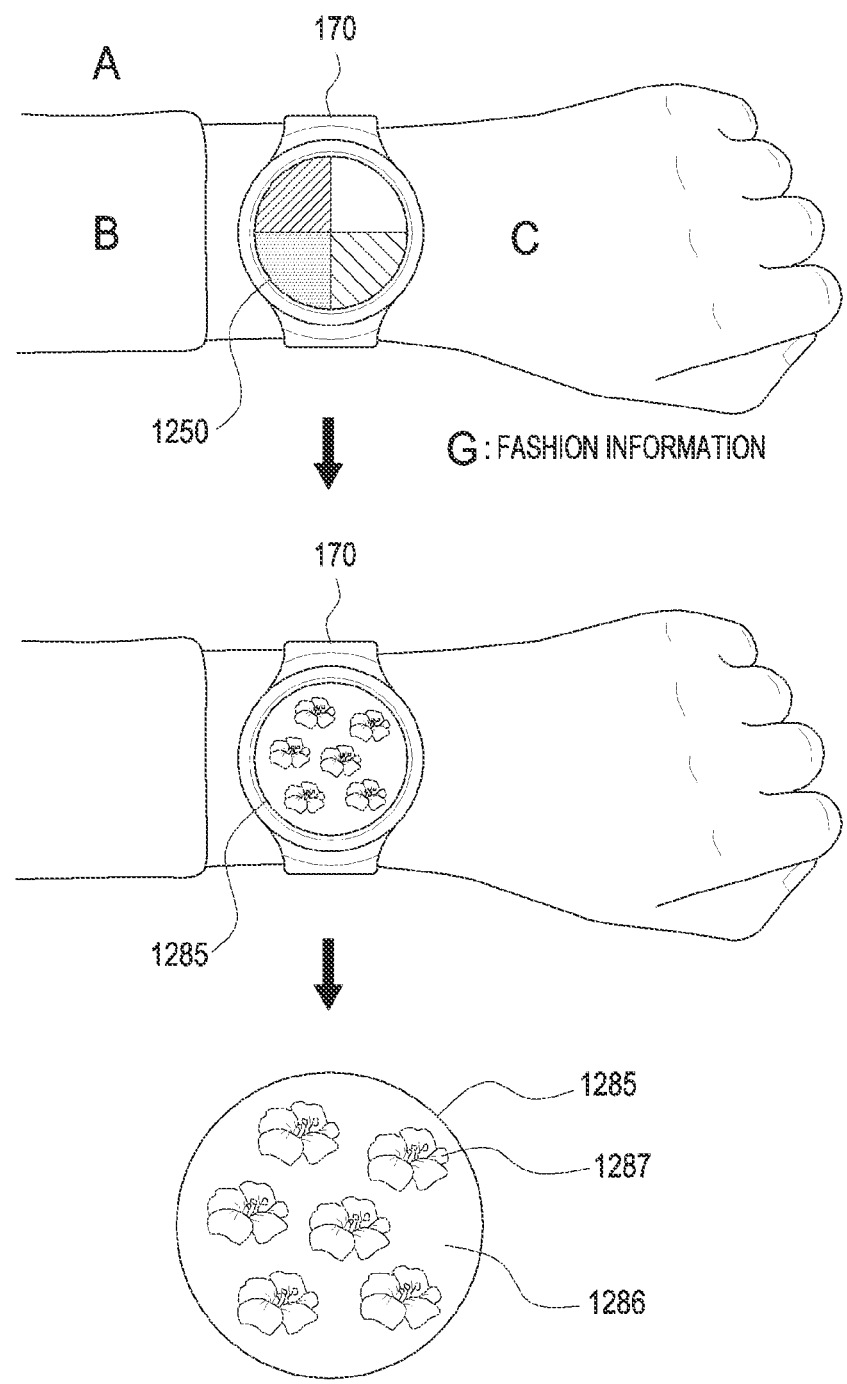

Referring to FIG. 12*f*, the first electronic device 101 may generate a second screen 1285, using fashion information G in addition to the obtained information about the ambient brightness A of the second electronic device 170, the clothes B of the user, and the skin color C of the user, and display the second screen 1285 on the second electronic device 170.

According to some embodiments, the first electronic device 101 may determine a background 1286 of the second screen 1285 based on the ambient brightness A, the clothes B of the user, the skin color C of the user, and the additional information G. Therefore, the first electronic device 101 may obtain the additional information (e.g., the fashion information G), and determine the background 1286, using the fashion information G corresponding to the additional information. Herein, the first electronic device 101 may obtain the fashion information G popular in a corresponding location based on location information.

Further, the first electronic device 101 may determine an image related to the fashion information G as an object 1287 of the second screen 1285. For example, the first electronic device 101 may obtain an image (e.g., flower pattern) representing a corresponding fashion trend based on the obtained fashion information G (e.g., flower patterns), and determine the image as the object 1287 of the second screen 1285.

Figure 12G:
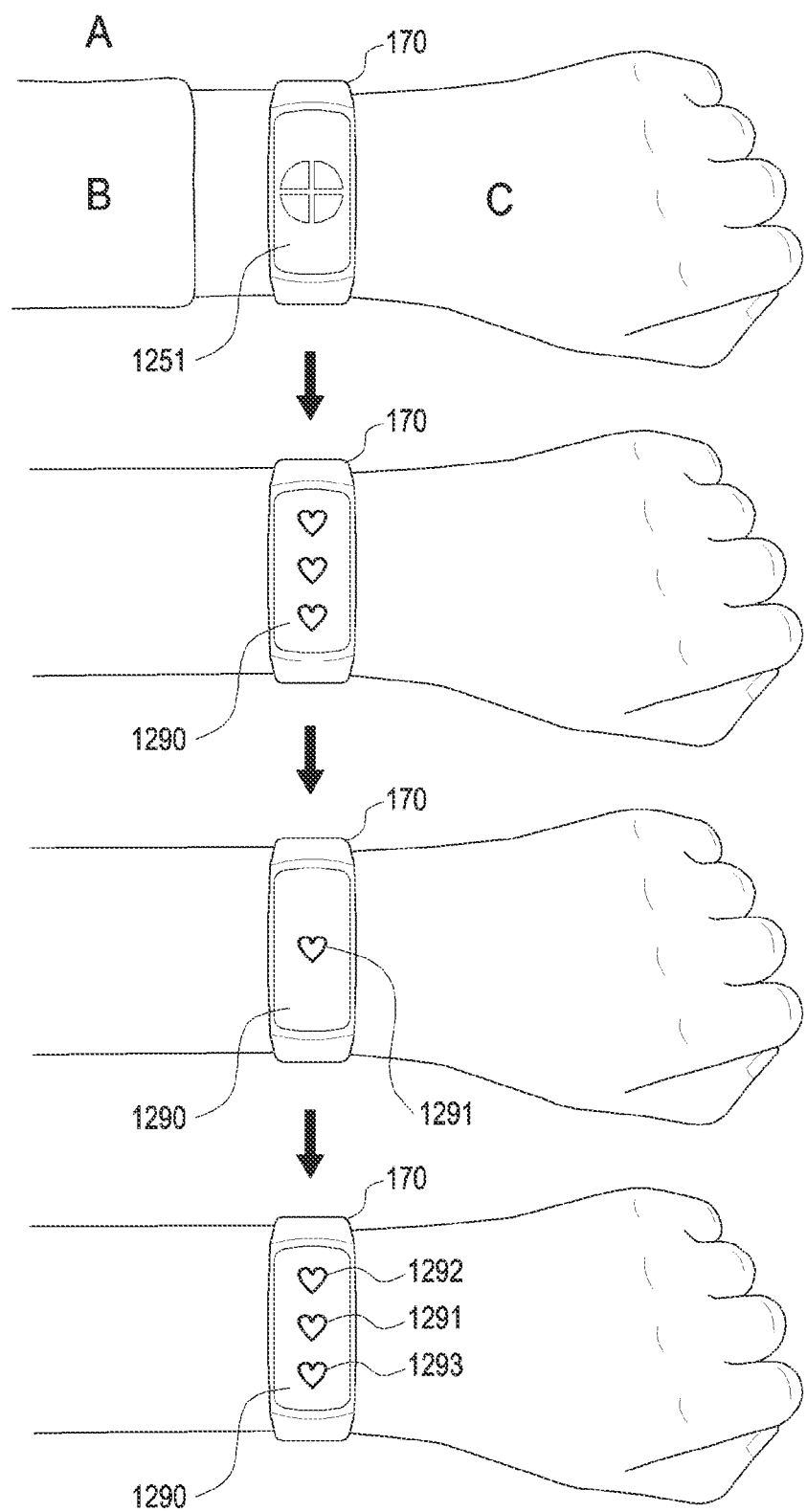

Referring to FIG. 12g, the second electronic device 170 may be implemented as an activity tracker. For example, the first electronic device 101 may generate a second screen 1290, using the obtained information about the ambient brightness A of the second electronic device 170, the clothes B worn by the user, and the skin color C of the user, and display the second screen 1290 on the second electronic device 170.

According to some embodiments, the first electronic device 101 may determine objects 1291, 1292, and 1293 for the second screen 1290 based on the ambient brightness A, the clothes B worn by the user, and the skin color C of the user. For example, the first electronic device 101 may determine the shapes, sizes, colors, display order, and/or display frequencies of the objects 1291, 1292, and 1293 of the second screen 1290.

For example, the first electronic device 101 may determine a heart shape as an object included in the second screen. Further, the first electronic device 101 may determine the display order of the objects so that the first object 1291 is first displayed, followed by the second and third objects 1292 and 1293.

Figure 13A:
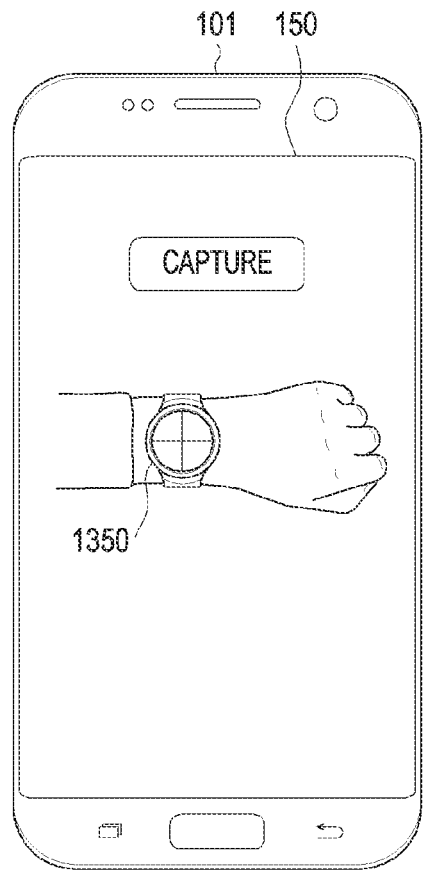
FIGS. 13a, 13b, and 13c are diagrams illustrating an operation of a first electronic device according to various embodiments of the present disclosure.
Figure 13B:
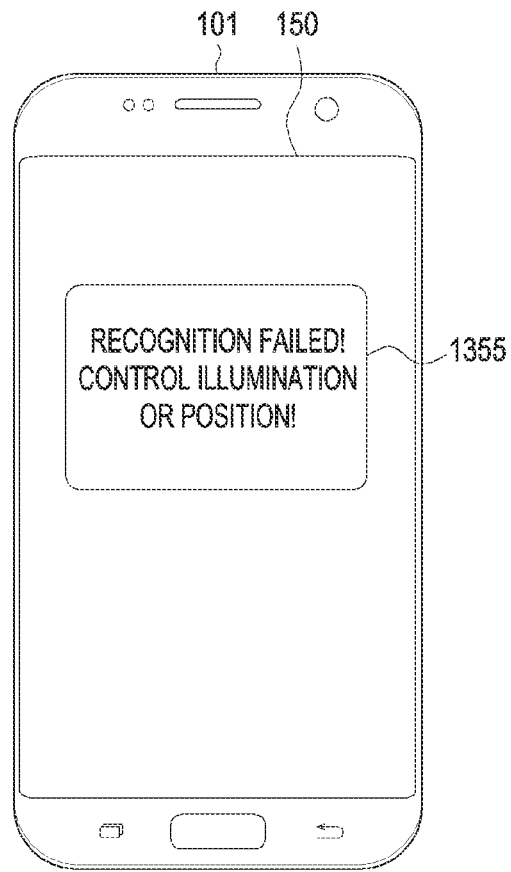
Figure 13C:
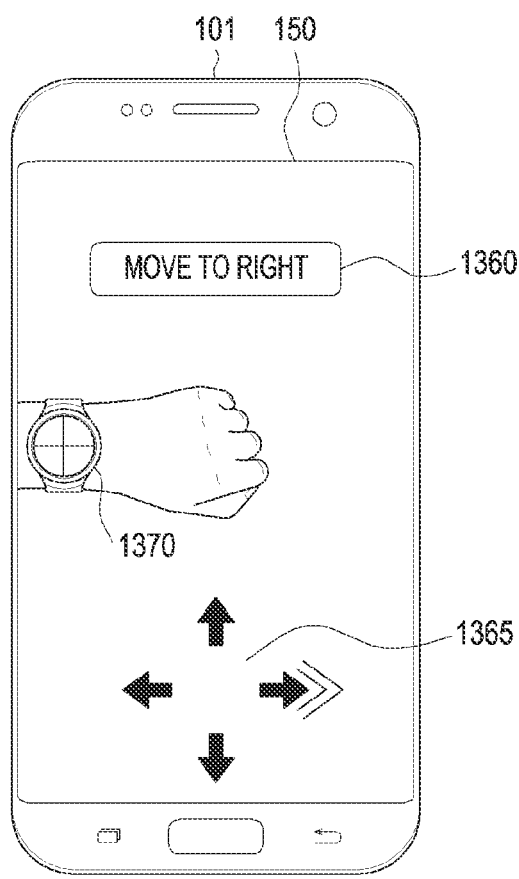

FIGS. 13a, 13b and 13c are diagrams illustrating an operation of a first electronic device according to various embodiments of the present disclosure.

Referring to FIG. 13a, the first electronic device 101 may recognize a first screen 1350 displayed on the second electronic device 170, using the camera module 120.

According to some embodiments, the first electronic device 101 may fail to recognize the first screen 1350 displayed on the second electronic device 170. For example, if the first electronic device 101 does not accurately identify the first screen 1350 displayed on the second electronic device 170, the first electronic device 101 may determine that it has failed in recognizing the first screen 1350.

Referring to FIG. 13b, upon failure in recognizing the first screen 1350, the first electronic device 101 may provide a message 1355 indicating recognition failure through the display 150. Further, the message 1355 indicating recognition failure may include a message requesting control of illumination or a position.

For example, the first electronic device 101 may provide the message 1355 indicating recognition failure until accurately recognizing the first screen 1350.

Referring to FIG. 13c, upon failure in recognizing the first screen 1350, the first electronic device 101 may provide a message requesting adjustment of the state or position of the first screen 1350 through the display 150.

According to some embodiments, the first electronic device 101 may provide a message 1360 and/or a guide 1365, requesting movement of the first screen 1350 in a specific direction (e.g., up, down, left, or right) in order to accurately recognize the first screen 1350. For example, the first electronic device 101 may display the message 1360 indicating "move to the right" on the display 150 so that the first screen 1370 is to be moved to the right. Further, the first electronic device 101 may display the guide 1365 indicating "move to the right" on the display 150 so that the first screen 1370 is to be moved to the right.

For example, the first electronic device 101 may provide the message 1360 and/or the guide 1365 requesting movement of the first screen 1370 in a specific direction (e.g., up, down, left, or right) until accurately recognizing the first screen 1370.

FIGS. 14a to 14e are diagrams illustrating an operation of a first electronic device according to various embodiments of the present disclosure.

Figure 14A:
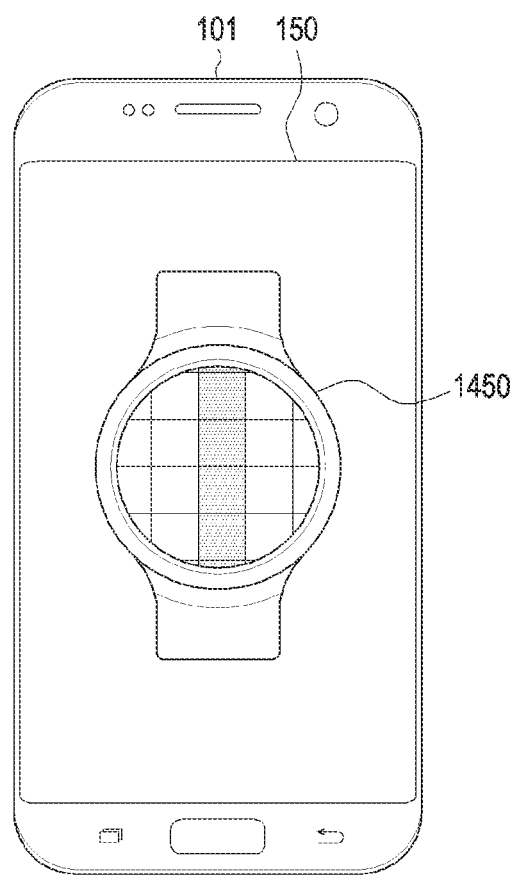
FIGS. 14a to 14e are diagrams illustrating an operation of a first electronic device according to various embodiments of the present disclosure.

Referring to FIG. 14a, the first electronic device 101 may obtain (or generate) a second screen 1450.

According to some embodiments, the first electronic device 101 may display the second screen 1450 on the display 150, for adjustment (or change) of the second screen 1450. The first electronic device 101 may adjust the second screen 1450 in response to an input (e.g., touch input) to the second screen.

Figure 14B:
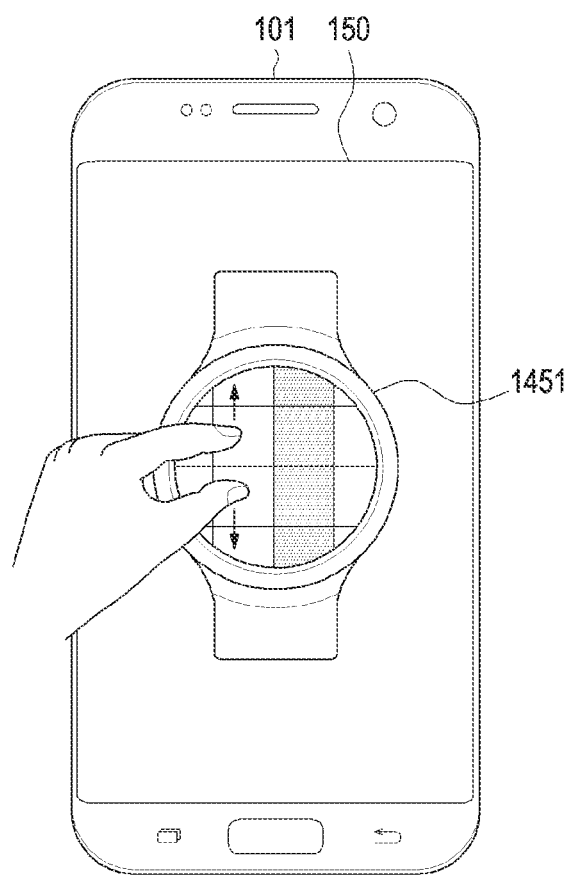

Referring to FIG. 14b, the first electronic device 101 may enlarge the second screen 1450 in response to a touch input corresponding to zoom-in, and display an enlarged second screen 1451.

Figure 14C:
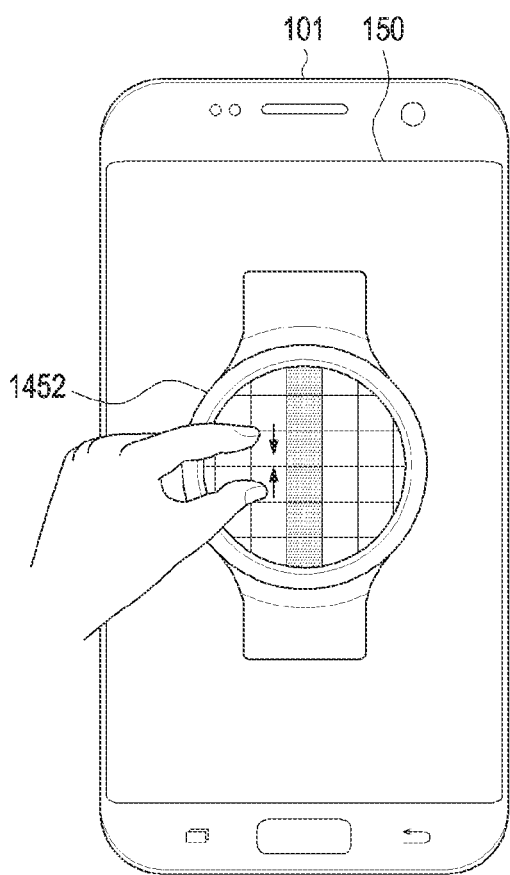

Referring to FIG. 14c, the first electronic device 101 may contract the second screen 1450 in response to a touch input corresponding to zoom-out, and display a contracted second screen 1452.

Figure 14D:
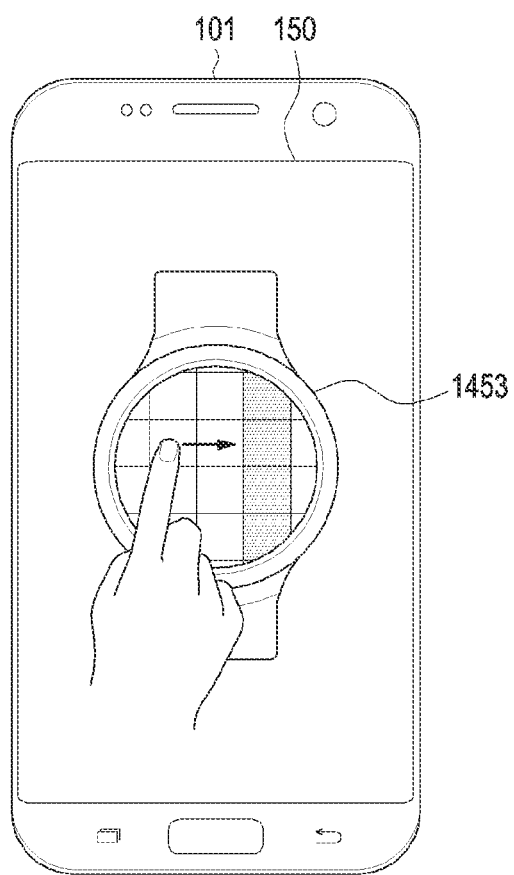

Referring to FIG. 14d, the first electronic device 101 may move the second screen 1450 in response to a touch input corresponding to swipe, and display a moved second screen 1453.

Figure 14E:
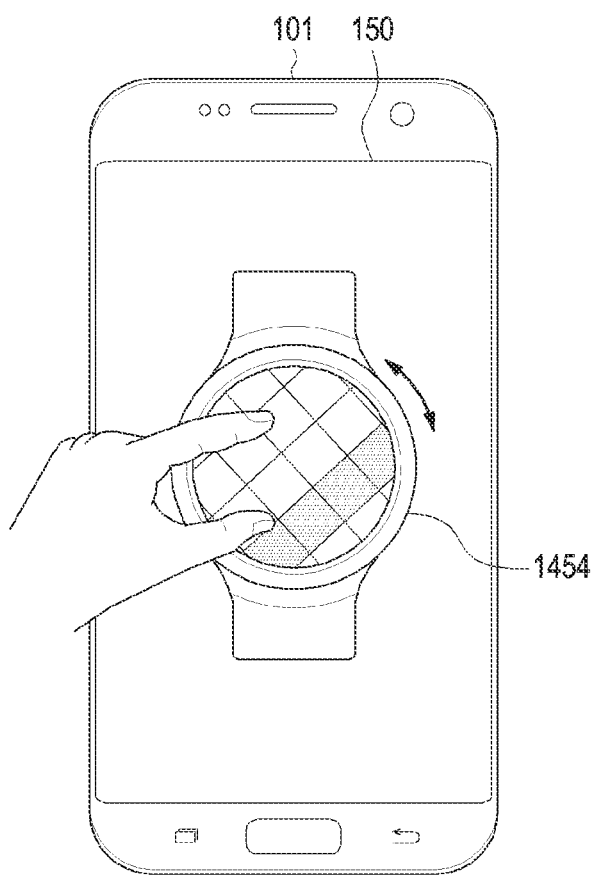

Referring to FIG. 14e, the first electronic device 101 may rotate the second screen 1450 in response to a touch input corresponding to rotation, and display a rotated second screen 1454.

FIGS. 15a to 15e are diagrams illustrating an operation of a first electronic device according to various embodiments of the present disclosure.

Figures 15A, 15B:
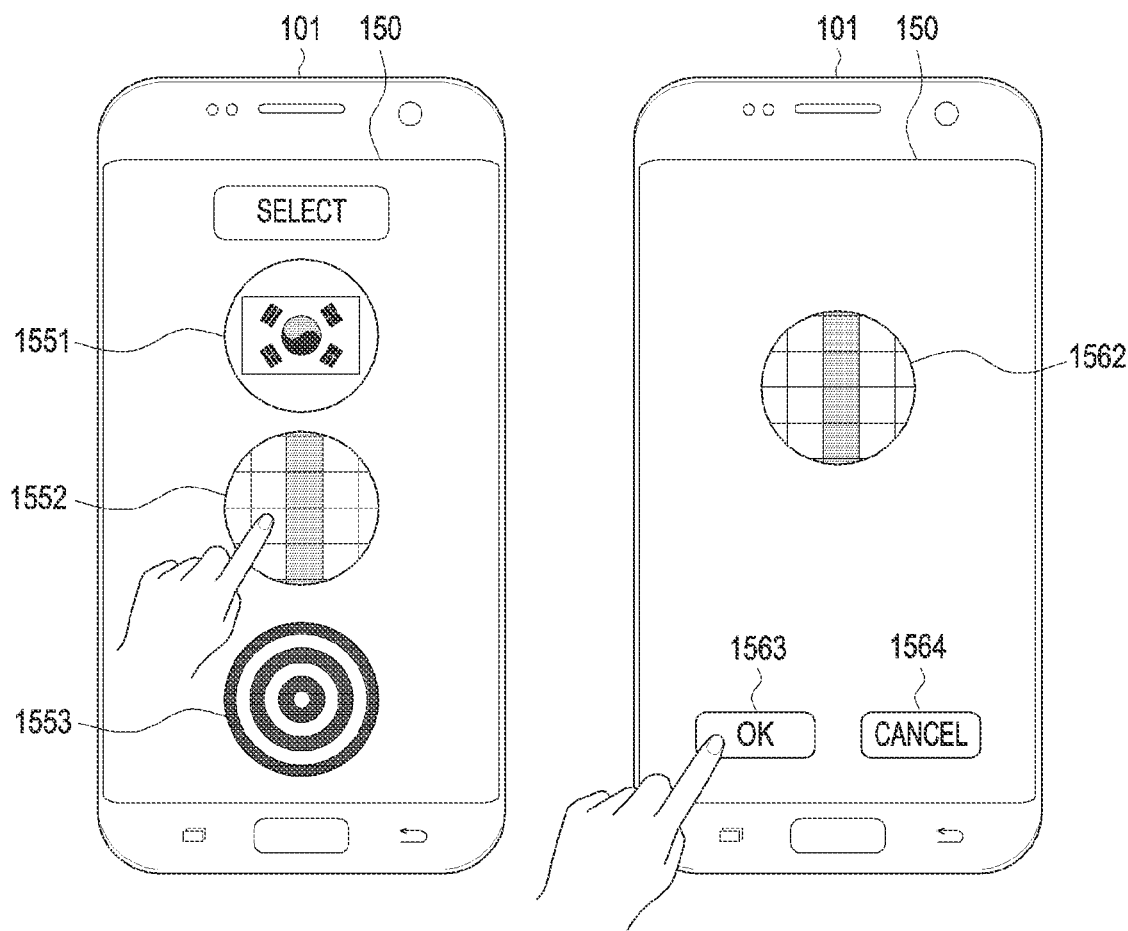
FIGS. 15a to 15e are diagrams illustrating operations of a first electronic device and a second electronic device according to various embodiments of the present disclosure.

Referring to FIG. 15a, the first electronic device 101 may obtain (or generate) a plurality of second screens 1551, 1552 and 1553.

According to some embodiments, the first electronic device 101 may display the plurality of second screens 1551, 1552 and 1553 on the display 150. The first electronic device 101 may select one of the plurality of second screens 1551, 1552 and 1553 on the display 150.

For example, the first electronic device 101 may select the second screen 1552 corresponding to a touch input from among the plurality of second screens 1551, 1552 and 1553.

Referring to FIG. 15b, the first electronic device 101 may display the selected second screen 1562 on the display 150.

The first electronic device 101 may determine whether to apply the selected second screen 1562 to the second electronic device 170.

For example, upon input of a touch on an area 1563 corresponding to "OK", the first electronic device 101 may transmit information IM2 about the second screen 1562 to the second electronic device 170. On the other hand, upon input of a touch on an area 1564 corresponding to "Cancel", the first electronic device 101 may not transmit the information IM2 about the second screen 1562 to the second electronic device 170. Herein, the first electronic device 101 may display a screen prompting the user to "Select" illustrated in FIG. 15a.

Figure 15C:
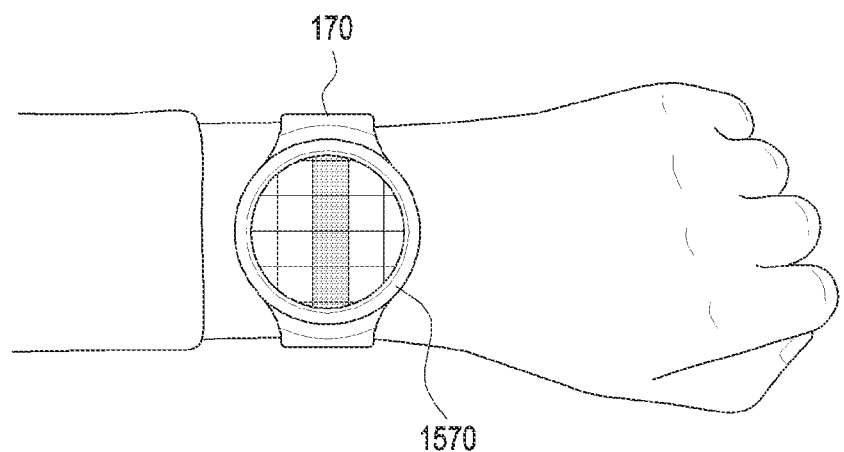

Referring to FIG. 15c, the second electronic device 170 may display a second screen 1570 based on the information IM2 about the second screen received from the first electronic device 101 on the display 190.

For example, the second electronic device 170 may display the second screen 1570 as a watch face.

Figure 15D:
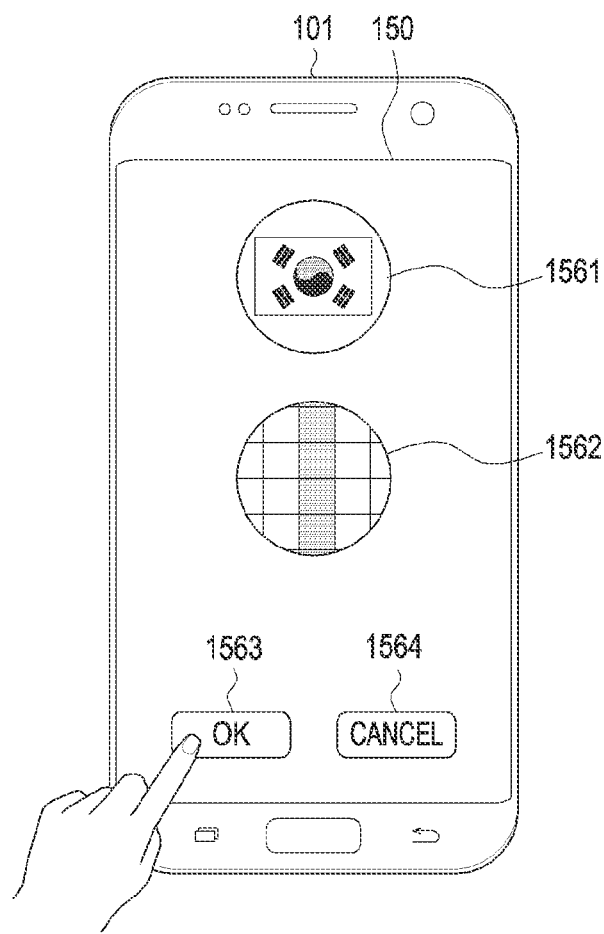

Referring to FIG. 15*d*, the first electronic device 101 may select the plurality of second screens 1551 and 1552 corresponding to a touch input from among the plurality of second screens 1551, 1552 and 1553.

The first electronic device 101 may display the plurality of selected second screens 1561 and 1562 on the display 150.

The first electronic device 101 may determine whether to apply the selected second screens 1561 and 1562 to the second electronic device 170.

For example, upon input of a touch on the area 1563 corresponding to "OK", the first electronic device 101 may transmit information IM2 about the second screens 1561 and 1562 to the second electronic device 170. For example, upon input of a touch on the area 1563 corresponding to "OK", the first electronic device 101 may generate one second screen based on the selected second screens 1561 and 1562. The first electronic device 101 may generate one second screen by synthesizing the selected second screens 1561 and 1562. Then, the first electronic device 101 may transmit information IM2 about the one second screen generated based on the second screens 1561 and 1562 to the second electronic device 170.

On the other hand, upon input of a touch on the area 1564 corresponding to "Cancel", the first electronic device 101 may not transmit the information IM2 about the second screens 1561 and 1562 to the second electronic device 170. Herein, the first electronic device 101 may display a screen prompting the user to "Select" illustrated in FIG. 15*a*.

Figure 15E:
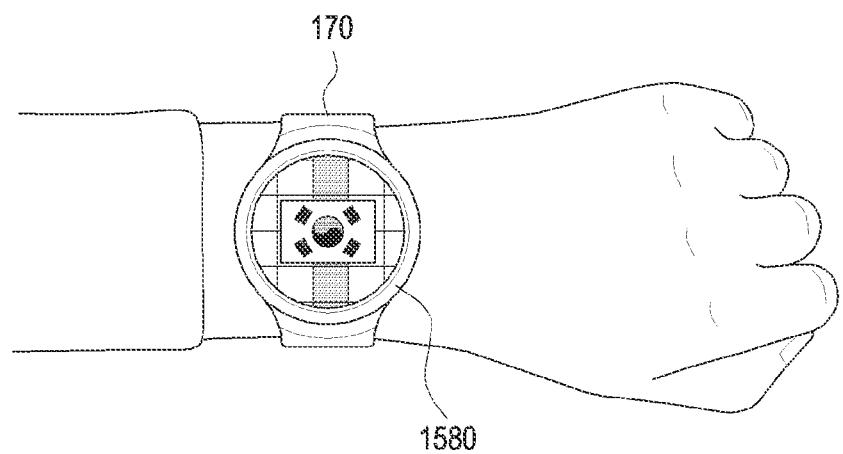

Referring to FIG. 15*e*, the second electronic device 170 may display a second screen 1580 based on the information IM2 about the second screen received from the first electronic device 101 on the display 190.

For example, the second electronic device 170 may display the second screen 1580 as a watch face. The second screen 1580 may include the image generated by synthesizing the selected second screens 1561 and 1562.

Figure 16:
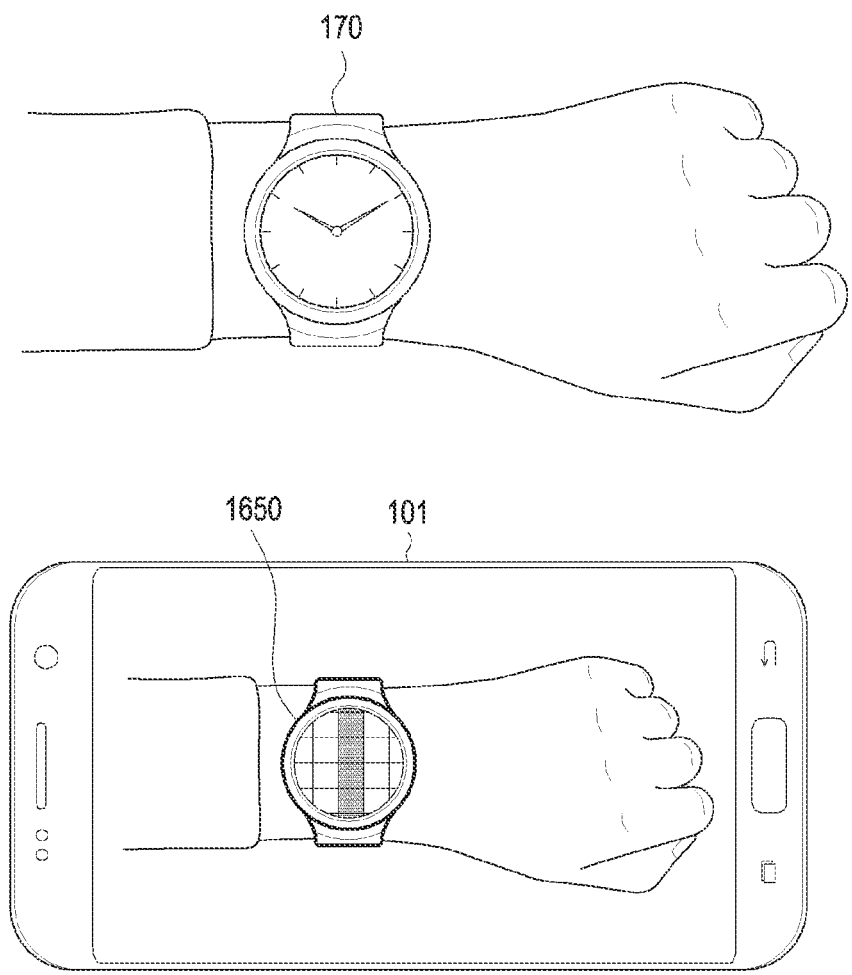
FIG. 16 is a diagram illustrating an operation of a first electronic device according to various embodiments of the present disclosure.

FIG. 16 is a diagram illustrating an operation of a first electronic device according to various embodiments of the present disclosure.

Referring to FIG. 16, the electronic device 101 may obtain (or generate) a second screen 1650, and display the obtained second screen 1650 on the display 150.

According to some embodiments, the first electronic device 101 may display the second screen 1650 by augmented reality (AR).

The first electronic device 101 may capture the second electronic device 170 and a user's body part (e.g., a part of a hand and a wrist) wearing the second electronic device 170 by means of the camera module 120. Further, the first electronic device 101 may display the captured second electronic device 170 and the captured body part of the user wearing the second electronic device 170 on the display 150.

For example, the first electronic device 101 may display the second screen 1650 in an area corresponding to the display 190 of the second electronic device 170 by AR.

As such, even though the second screen 1650 is not displayed on the second electronic device 170, the user may determine whether the second screen 1650 generated by the first electronic device 101 matches the user.

FIGS. 17*a* to 17*f* are diagrams illustrating an operation of a second electronic device according to various embodiments of the present disclosure.

Figure 17A:
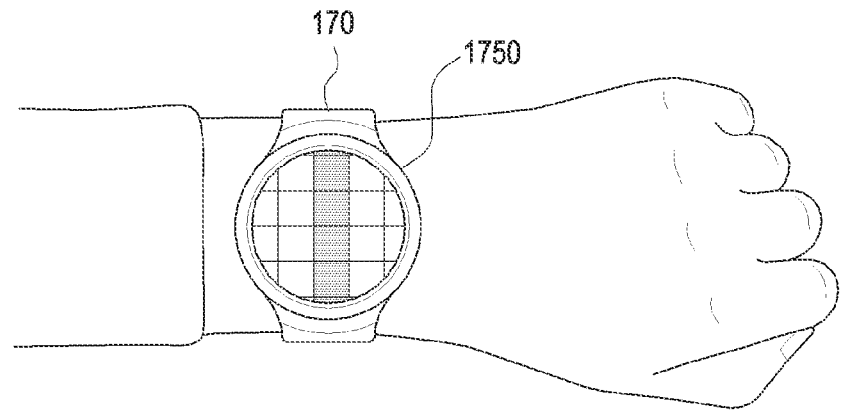
FIGS. 17a to 17f are diagrams illustrating an operation of a second electronic device according to various embodiments of the present disclosure.

Referring to FIG. 17*a*, the second electronic device 170 may display a second screen 1750 obtained from the first electronic device 101 on the display 190.

According to some embodiments, the second electronic device 170 may adjust (or change) the displayed second screen 1750. The second electronic device 170 may adjust the second screen 1750 in response to an input (e.g., touch input) to the second screen 1750.

Figure 17B:
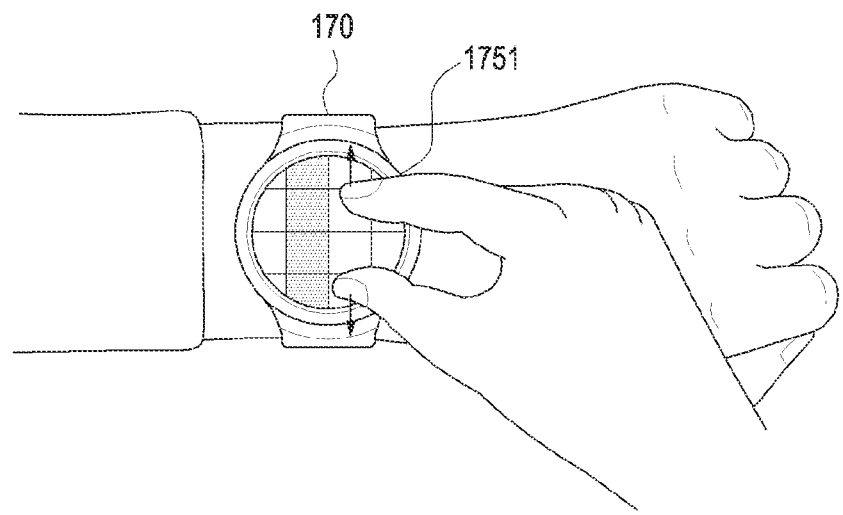

Referring to FIG. 17*b*, the second electronic device 170 may enlarge the second screen 1750 in response to a touch input corresponding to zoom-in, and display an enlarged second screen 1751.

Figure 17C:
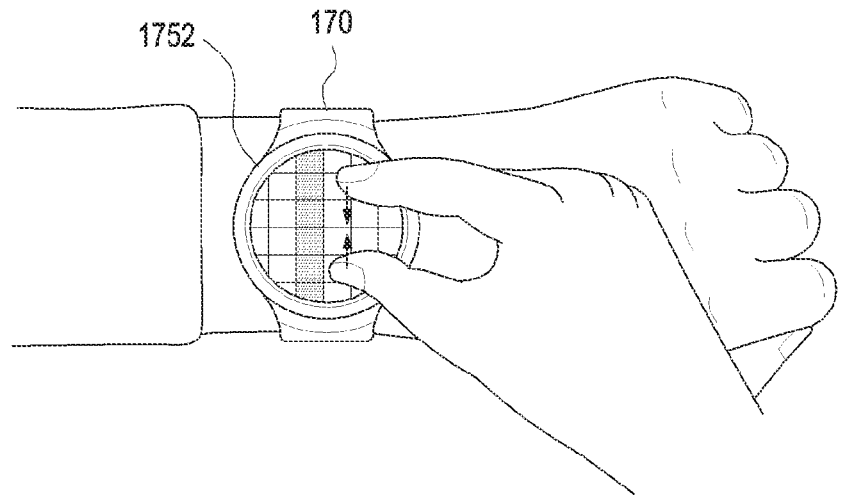

Referring to FIG. 17*c*, the second electronic device 170 may contract the second screen 1750 in response to a touch input corresponding to zoom-out, and display a contracted second screen 1752.

Figure 17D:
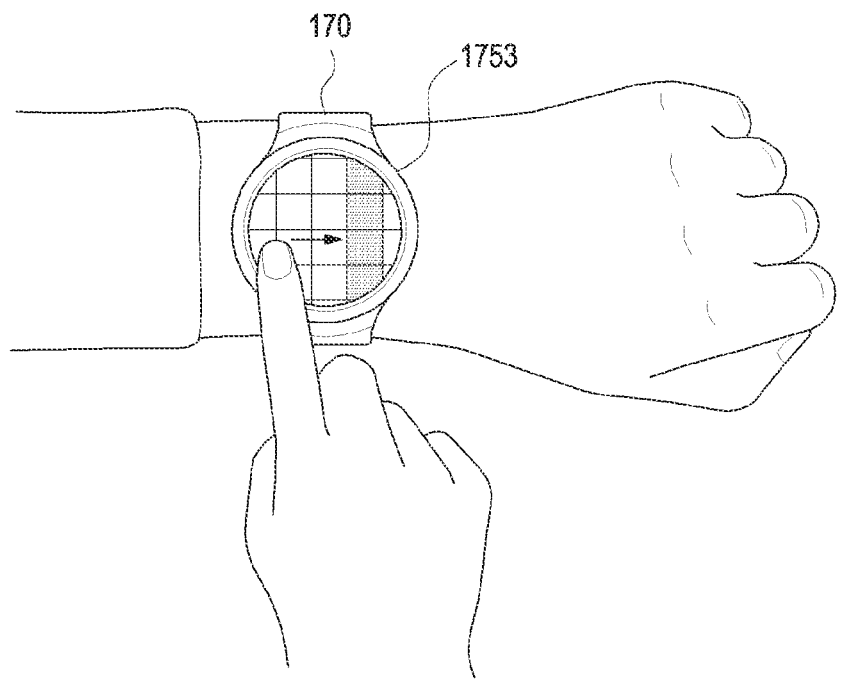

Referring to FIG. 17*d*, the second electronic device 170 may move the second screen 1750 in response to a touch input corresponding to swipe, and display a moved second screen 1753.

Figure 17E:
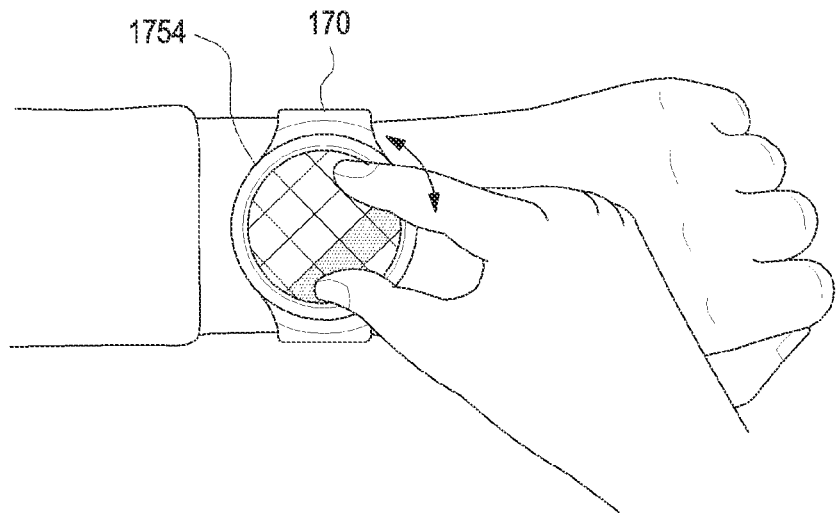

Referring to FIG. 17*e*, the second electronic device 170 may rotate the second screen 1750 in response to a touch input corresponding to rotation, and display a rotated second screen 1754.

Figure 17F:
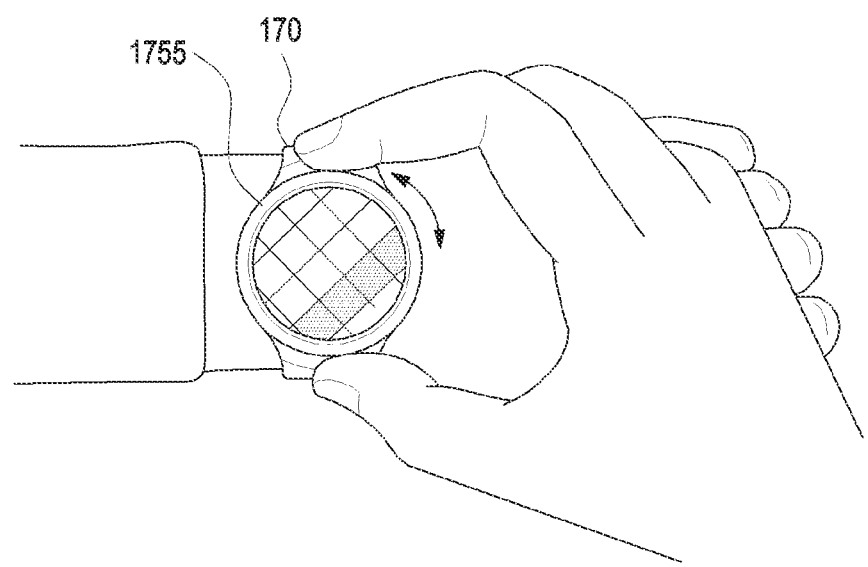

Referring to FIG. 17*f*, the second electronic device 170 may adjust (or change) the second screen 1750 through an input device (not shown) included in the second electronic device 170.

According to some embodiments, the second electronic device 170 may adjust the second screen 1750 in response to an input to the input device of the second electronic device 170. Further, the second electronic device 170 may display an adjusted second screen 1755. For example, the input device may be implemented in the form of a bezel (e.g., the bezel of a watch) of the second electronic device 170.

For example, if the input device of the second electronic device 170 rotates, the second electronic device 170 may rotate the second screen 1750 in response to the input corresponding to rotation, and display a rotated second screen 1755.

According to various embodiments of the present disclosure, an electronic device may include a camera module, a communication module configured to communicate with a second electronic device, and a processor configured to capture a first screen displayed on a display of the second electronic device and an external background of the second electronic device by using the camera module, and to obtain a second screen for the second electronic device by using the first screen and the external background.

To configure the second screen for the second electronic device, the processor may transmit information about the first screen to the second electronic device to display the first screen including a color pattern on the display of the second electronic device The processor may obtain ambient information about the external background of the second electronic device by using the color pattern displayed on the second electronic device, and obtain the second screen by using the obtained ambient information.

The processor may determine wearing information and an ambient color of the second electronic device by using the color pattern displayed on the second electronic device and obtain the idle screen based on the wearing information and ambient color.

The processor may determine the ambient color by comparing the color pattern displayed on the second electronic device, obtained through the camera module with at least one of an ambient brightness of the second electronic device, the skin color of a user, a pattern of clothes worn by the user, or a color of the clothes worn by the user.

The processor may determine the wearing information including at least one of a position, direction, or inclination angle of the second electronic device by comparing the color pattern displayed on the second electronic device, obtained through the camera module with a reference pattern stored in the first electronic device.

The processor may obtain a background of the second screen by using the ambient information, and obtain an object contrasting with the background, to be displayed in the background.

The first electronic device may further include a GPS module, and the processor may obtain additional information based on location information received through the GPS module, and generate the second screen including an image related to the additional information.

The additional information may include at least one of event information, weather information, country information, time information, season information, or fashion information, related to the location information.

The first electronic device may further include a touch screen, and the processor may display the second screen on the touch screen and adjust a size or shape of the second screen in response to a touch input to the second screen.

The second electronic device may include a smart watch, and the second screen may include a watch face.

According to various embodiments of the present disclosure, a method of operating an electronic device includes capturing a first screen displayed on a display of a second electronic device and an external background of the second electronic device by using a camera module, and obtaining a second screen for the second electronic device by using the captured first screen and external background.

The capturing of a first screen and an external background may include transmitting information about the first screen to the second electronic device to display the first screen including a color pattern on the display of the second electronic device, to configure the second screen for the second electronic device.

The obtaining of a second screen may include obtaining ambient information about the external background of the second electronic device by using the color pattern displayed on the second electronic device, and obtaining the second screen by using the obtained ambient information.

The obtaining of a second screen may include determining wearing information and an ambient color of the second electronic device by using the color pattern displayed on the second electronic device, and obtaining the second screen based on the wearing information and the ambient color.

The obtaining of a second screen may include determining the ambient color by comparing the color pattern displayed on the second electronic device, obtained through the camera module with at least one of an ambient brightness of the second electronic device, the skin color of a user, a pattern of clothes worn by the user, or a color of the clothes worn by the user.

The obtaining of a second screen may include determining the wearing information including at least one of a position, direction, or inclination angle of the second electronic device by comparing the color pattern displayed on the second electronic device, obtained through the camera module with a reference pattern stored in the first electronic device.

The capturing of a first screen and an external background may include generating a first screen to configure the second screen of the second electronic device, and transmitting information about the first screen to the second electronic device.

The capturing of a first screen and an external background may include generating a first screen in response to a request signal received from the second electronic device, and transmitting information about the first screen to the second electronic device.

The method may further include displaying the second screen on a touch screen of the first electronic device, and adjusting a size or shape of the second screen in response to a touch input to the second screen. According to various embodiments of the present disclosure, a second electronic device may include a display, a communication module communicating with a first electronic device, and a processor configured to display a first screen on the display in response to information about the first screen, received from the first electronic device, for configuring a second screen of a second electronic device, and to receive, when the first electronic device captures an external background of the second electronic device by using the first screen displayed on the second electronic device, information about the second screen from the first electronic device, for use in configuring the second screen.

The processor may display a color pattern on the display by using the information about the first screen.

The external background may include wearing information and an ambient color of the first electronic device, determined based on the color pattern displayed on the second electronic device, and the second screen may be generated based on the wearing information and the ambient color.

The second electronic device may include a smart watch and the second screen may include a watch face.

According to various embodiments of the present disclosure, a recording medium may record a computer program that performs operations of capturing a first screen displayed on a display of a second electronic device and an external background of the second electronic device, and obtaining a second screen for the second electronic device by using the captured first screen and external background.

Each of the above-described components of the electronic device may include one or more parts and the name of the component may vary with the type of the electronic device. According to various embodiments, some components may be omitted from or added to the electronic device. Further, in various embodiments, one entity may be configured by combining some of the components of the electronic device to thereby perform the same functions of the individual components.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a touch screen;
   a camera;
   a communication module configured to communicate with a wearable electronic device;
   a processor; and
   memory storing instructions that, when executed by the processor, cause the electronic device to:

based on identifying a request to change a watch face of the wearable electronic device, control the camera to obtain a first image by photographing the wearable electronic device displaying a first screen image together with an external background near the wearable electronic device when the wearable electronic device is worn by a wrist of a user, the first image comprising:

a first portion of the first image corresponding to the first screen image that is displayed on a display of the wearable electronic device, the first screen image comprising a color pattern including a plurality of colors; and a second portion of the first image corresponding to the external background of the wearable electronic device, the external background being external to the first screen image and the external background including ambient brightness information of the wearable electronic device, a strap of the wearable electronic device, a skin of the user, and a cloth of the user;

identify the first portion corresponding to the first screen image and the second portion corresponding to the external background, based on the first image;

obtain at least one screen image, based on the color pattern included in the first portion of the first image, the ambient brightness information, a color of the strap of the wearable electronic device, a color of the skin of the user, and a color of the cloth of the user included in the second portion of the first image, and display, on the touch screen, the at least one screen image;

identify a second screen image among the at least one screen image based on a user input on the touch screen, the second screen image being to be displayed on the display of the wearable electronic device as the watch face of the wearable electronic device and the second screen image being different from the first screen image; and in response to identifying the second screen image, control the communication module to transmit, to the wearable electronic device, information of the second screen image obtained by the electronic device such that the first screen image displayed on the display of the wearable electronic device is automatically changed to the second screen image.

2. The electronic device of claim 1, wherein the instructions, when executed by the processor, cause the electronic device to:

obtain the ambient brightness information of the external background of the wearable electronic device, using the color pattern included in the first screen image displayed on the display of the wearable electronic device; and obtain the at least one screen image, using the obtained ambient brightness information.

3. The electronic device of claim 2, wherein the instructions, when executed by the processor, cause the electronic device to:

obtain a background of the at least one screen image, using the obtained ambient brightness information; and obtain an object contrasting with the background, to be displayed in the obtained background.

4. The electronic device of claim 3, further comprising a global positioning system (GPS) module, wherein the instructions, when executed by the processor, cause the electronic device to:

obtain additional information, based on location information that is received through the GPS module; and obtain the at least one screen image comprising an image related to the obtained additional information.

5. The electronic device of claim 4, wherein the additional information comprises any one or any combination of event information, weather information, country information, time information, season information, and fashion information, related to the location information.

6. The electronic device of claim 1, wherein the instructions, when executed by the processor, cause the electronic device to:

determine an ambient color by comparing the color pattern included in the first screen image displayed on the display of the wearable electronic device, with any one or any combination of an ambient brightness of the wearable electronic device, the color of the skin of the user, a pattern of clothes that is worn by the user, and a color of the clothes worn by the user; and obtain the at least one screen image, based on the determined ambient color.

7. The electronic device of claim 1, wherein the instructions, when executed by the processor, cause the electronic device to:

determine wearing information comprising any one or any combination of a position, a direction, and an inclination angle of the wearable electronic device by comparing the color pattern included in the first screen image displayed on the display of the wearable electronic device, with a reference pattern that is stored in the electronic device; and obtain the at least one screen image, based on the determined wearing information.

8. The electronic device of claim 1, wherein the instructions, when executed by the processor, cause the electronic device to:

display the second screen image on the touch screen; and adjust a size or shape of the second screen image, based on a touch input to the displayed second screen image.

9. The electronic device of claim 1, wherein the wearable electronic device comprises a smart watch.

10. A method of operating an electronic device, the method comprising:

based on identifying a request to change a watch face of a wearable electronic device, controlling a camera of the electronic device to obtain a first image by photographing the wearable electronic device displaying a first screen image together with an external background near the wearable electronic device when the wearable electronic device is worn by a wrist of a user, the first image comprising:

a first portion of the first image corresponding the first screen image that is displayed on the display of the wearable electronic device, the first screen image comprising a color pattern including a plurality of colors; and a second portion of the first image corresponding to the external background of the wearable electronic device, the external background being external to the first screen image and the external background including ambient brightness information of the wearable electronic device, a strap of the wearable electronic device, a skin color of the user, and a cloth of the user;

identifying the first portion corresponding to the first screen image and the second portion corresponding to the external background, based on the first image;

identifying at least one screen image, based on the color pattern included in the first portion of the first image and the ambient brightness information, a color of the strap of the wearable electronic device, the skin color of the user, and a color of the cloth of the user included in the second portion of the first image and displaying, on a touch screen of the electronic device, the at least one screen image;

identifying a second screen image among the at least one screen image based on a user input on the touch screen, the second screen image being to be displayed on the display of the wearable electronic device as the watch face of the wearable electronic device and the second screen image being different from the first screen image; and in response to identifying the second screen image, transmitting, to the wearable electronic device, information of the second screen image obtained by the electronic device such that the first screen image displayed on the display of the wearable electronic device is automatically changed to the second screen image.

11. The method of claim 10, wherein the obtaining of the at least one screen image comprises:

obtaining the ambient brightness information of the external background of the wearable electronic device, using the color pattern included in the first screen image displayed on the display of the wearable electronic device, the first screen image being included in the first image; and obtaining the second screen image, using the obtained ambient brightness information.

12. The method of claim 11, wherein the obtaining of the at least one screen image comprises:

obtaining a background of the at least one screen image, using the obtained ambient brightness information; and obtaining an object contrasting with the background, to be displayed in the obtained background.

13. The method of claim 12, wherein the obtaining of the at least one screen image comprises:

obtaining additional information, based on location information that is received through a GPS module of the electronic device; and obtaining the at least one screen image comprising an image related to the obtained additional information.

14. The method of claim 13, wherein the additional information comprises any one or any combination of event information, weather information, country information, time information, season information, and fashion information, related to the location information.

15. The method of claim 10, wherein the obtaining of the at least one screen image comprises:

determining wearing information and an ambient color of the wearable electronic device, using the color pattern included in the first screen image displayed on the display of the wearable electronic device, the first screen image being included in the first image; and obtaining the second screen image, based on the determined wearing information and the determined ambient color.

16. The method of claim 10, wherein the obtaining of the at least one screen image comprises:

determining wearing information comprising any one or any combination of a position, a direction, and an inclination angle of the wearable electronic device by comparing the color pattern included in the first screen image displayed on the display of the wearable electronic device, with a reference pattern that is stored in the electronic device; and obtaining the at least one screen image, based on the determined wearing information.

17. The method of claim 10, further comprising:

displaying the second screen image on the touch screen; and adjusting a size or shape of the second screen image, based on a touch input to the displayed second screen image.

18. The method of claim 10, wherein the wearable electronic device comprises a smart watch.

* * * * *